United States Patent
Murakami et al.

(10) Patent No.: US 10,370,057 B2
(45) Date of Patent: Aug. 6, 2019

(54) VEHICLE HEIGHT ADJUSTMENT APPARATUS

(71) Applicant: Showa Corporation, Gyoda-shi (JP)

(72) Inventors: Yosuke Murakami, Fukuroi (JP); Hiroyuki Miyata, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 114 days.

(21) Appl. No.: 15/464,897

(22) Filed: Mar. 21, 2017

(65) Prior Publication Data

US 2017/0282995 A1    Oct. 5, 2017

(30) Foreign Application Priority Data

Mar. 31, 2016  (JP) ................................. 2016-071270

(51) Int. Cl.
*B62K 25/08*  (2006.01)
*B60G 11/56*  (2006.01)
(Continued)

(52) U.S. Cl.
CPC .............. *B62K 25/08* (2013.01); *B60G 11/56* (2013.01); *B60G 17/048* (2013.01); *B60G 17/08* (2013.01);
(Continued)

(58) Field of Classification Search
CPC ...... B60G 11/56; B60G 17/048; B60G 17/08; B60G 17/0272; B60G 2202/413;
(Continued)

(56) References Cited

U.S. PATENT DOCUMENTS

| 4,273,317 A | * | 6/1981 | Blee ................... B60G 17/0152 |
| | | | 267/64.17 |
| 4,911,470 A | | 3/1990 | Fukunaga |

(Continued)

FOREIGN PATENT DOCUMENTS

| CN | 102878236 A | 1/2013 |
| CN | 105051401 A | 11/2015 |

(Continued)

OTHER PUBLICATIONS

Extended European Search Report dated Aug. 24, 2017 for the corresponding European Patent Application No. 17162227.7.
(Continued)

*Primary Examiner* — Joseph M Rocca
*Assistant Examiner* — Felicia L. Brittman
(74) *Attorney, Agent, or Firm* — Leason Ellis LLP

(57) ABSTRACT

A vehicle height adjustment apparatus according to one embodiment includes a spring, a spring-length changing unit, a first valve, a control valve and a second valve. The spring-length changing unit changes a length of the spring in accordance with an amount of oil in a jack chamber that accommodates the oil. The first valve opens and closes a first communication path in which the oil supplied from a pump is oriented toward a reservoir chamber that stores the oil. The control valve opens and closes a discharge flow path oriented toward the reservoir chamber from a chamber that accommodates the oil to close the first valve. The second valve opens and closes a second communication path in which the oil supplied from the pump is oriented toward the jack chamber when the first valve is closed.

5 Claims, 14 Drawing Sheets

(51) Int. Cl.
*B60G 17/048* (2006.01)
*F16F 1/12* (2006.01)
*B60G 17/08* (2006.01)
*B62K 25/28* (2006.01)
*B62K 25/04* (2006.01)
*B60G 15/06* (2006.01)
*B60G 17/027* (2006.01)

(52) U.S. Cl.
CPC ............ *B62K 25/283* (2013.01); *F16F 1/121* (2013.01); *B60G 15/061* (2013.01); *B60G 17/0272* (2013.01); *B60G 2202/413* (2013.01); *B60G 2202/416* (2013.01); *B60G 2300/12* (2013.01); *B60G 2500/20* (2013.01); *B60G 2500/30* (2013.01); *B60G 2500/322* (2013.01); *B60G 2800/914* (2013.01); *B62K 2025/044* (2013.01); *B62K 2025/045* (2013.01); *B62K 2201/04* (2013.01); *B62K 2201/08* (2013.01)

(58) Field of Classification Search
CPC .......... B60G 2202/416; B60G 2300/12; B60G 2500/20; B60G 2500/30; B60G 2500/322; B60G 2800/914; B60G 2202/414; B62K 25/08; B62K 2025/044; B62K 2025/045; B62K 2201/04; B62K 2201/08; F16F 1/121; F16F 9/56
USPC ........................................................ 280/283
See application file for complete search history.

(56) References Cited

U.S. PATENT DOCUMENTS

| | | |
|---|---|---|
| 5,211,420 A | 5/1993 | Iwashita |
| 9,180,746 B2 | 11/2015 | Kasuga et al. |
| 2013/0015028 A1 | 1/2013 | Heyn et al. |
| 2014/0262655 A1 | 9/2014 | Tuts et al. |
| 2015/0273970 A1 | 10/2015 | Ishikawa |
| 2017/0036503 A1* | 2/2017 | Murakami ........... B62K 25/283 |

FOREIGN PATENT DOCUMENTS

| | | |
|---|---|---|
| JP | H04-100719 A | 4/1992 |
| JP | 08-022680 B | 3/1996 |

OTHER PUBLICATIONS

Office Action dated Apr. 30, 2019 for the corresponding Chinese Patent Application No. 201710173728.8 (an English translation attached hereto).

* cited by examiner

VEHICLE HEIGHT ADJUSTMENT APPARATUS

CROSS-REFERENCE TO RELATED APPLICATION(S)

This application claims priority from Japanese Patent Application No. 2016-071270 filed on Mar. 31, 2016, the entire contents of which are incorporated herein by reference.

BACKGROUND

Technical Field

The present invention relates to a vehicle height adjustment apparatus that adjusts the vehicle height of a motorcycle.

Related Art

In recent years, there is proposed an apparatus that increases the vehicle height of a motorcycle while traveling and decreases the vehicle height in order for a driver to easily get on and off the motorcycle at a stop.

For example, a vehicle height adjustment apparatus disclosed in JP-B-H08-22680 automatically changes the vehicle height of a motorcycle in response to the vehicle speed of the motorcycle. The vehicle height adjustment apparatus automatically raises the vehicle height when the vehicle speed reaches a set speed, and automatically lowers the vehicle height when the vehicle speed reaches a vehicle speed which is lower than or equal to the set speed. More specifically, when a switch is automatically turned on when the vehicle speed reaches the set speed and an electromagnetic actuator operates, when the vehicle speed reaches the above-described vehicle speed, an adjustment valve body is pushed out, and according to this, communication between a secondary side oil chamber and a primary side oil chamber which communicate with an oil chamber of a cylinder is blocked, and thus, discharge oil from a pump is pressurized from the primary side oil chamber to a working oil chamber via a through oil path. Due to this, a spring seat is pushed down, and according to this, the vehicle height is raised. In addition, when the switch is automatically turned off when the vehicle speed reaches a vehicle speed which is equal to or lower than the set speed, the adjustment valve body is attracted, the primary side oil chamber communicates with the secondary side oil chamber, and thus, working oil in a working oil chamber returns to the oil chamber of the cylinder via the primary side oil chamber and a passage, and the vehicle height is lowered.

SUMMARY

In an apparatus which changes a vehicle height in accordance with an amount of a fluid in an accommodation chamber which accommodates the fluid, such as oil (working oil), it is desirable to perform a control such that a valve is operated with high accuracy in a case where the valve is used for supplying the fluid to the accommodation chamber or for stopping the supply.

The invention provides a vehicle height adjustment apparatus which can operate a valve with high accuracy.

According to an aspect of the invention, a vehicle height adjustment apparatus includes a spring, changing device, a first valve, a back pressure adjustment valve, and a second valve. The spring has one end supported on a vehicle body side, and the other end supported on a wheel side. The changing device changes a length of the spring in accordance with an amount of fluid in an accommodation chamber that accommodates the fluid. The first valve opens and closes a first flow path in which the fluid supplied from a pump is oriented toward a storage chamber that stores the fluid. The back pressure adjustment valve opens and closes a discharge flow path oriented toward the storage chamber from a back pressure chamber that accommodates the fluid that applies a force in a direction in which the first valve is closed to the first valve. The second valve opens and closes a second flow path in which the fluid supplied from the pump is oriented toward the accommodation chamber in a case where the first valve is in a closed state.

According to the invention, it is possible to operate the valve with high accuracy.

DESCRIPTION OF EMBODIMENTS

Hereinafter, an embodiment will be described in detail with reference to the accompanying drawings.

Figure 1:
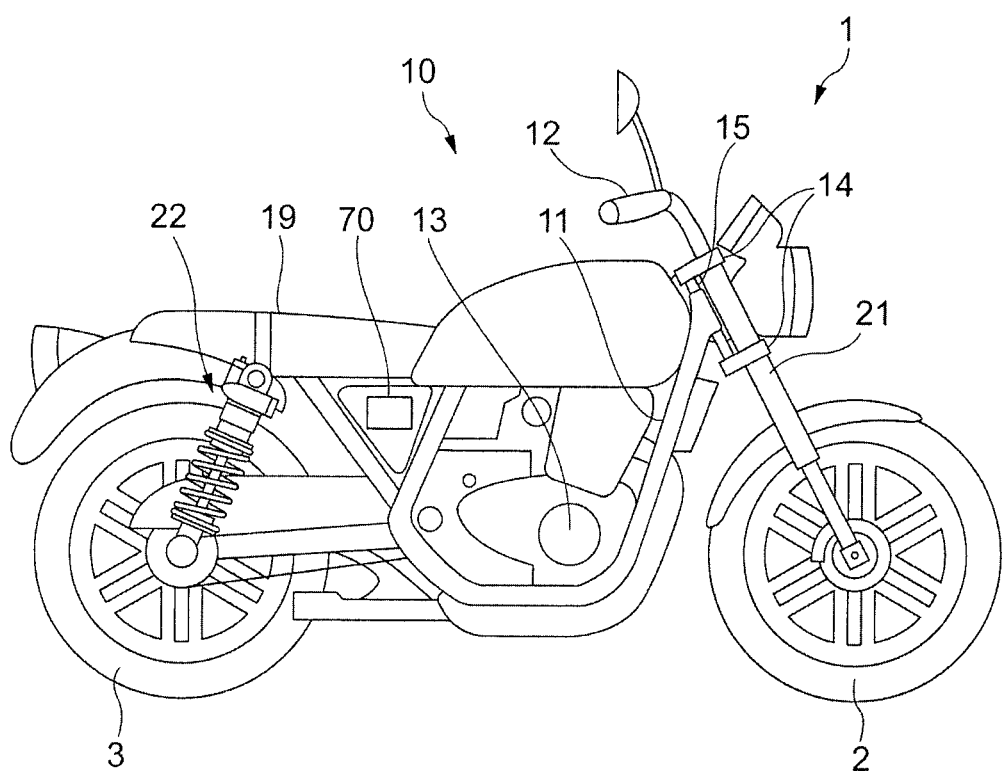
FIG. 1 is a view illustrating a schematic configuration of a motorcycle according to an embodiment.

FIG. 1 is a view illustrating the schematic view of a motorcycle 1 according to the embodiment.

The motorcycle 1 includes a front wheel 2 that is a wheel on a front side; a rear wheel 3 that is a wheel on a rear side; and a vehicle main body 10 that has a vehicle body frame 11 which is a frame of the motorcycle 1, a handle bar 12, an engine 13, a seat 19, and the like.

In addition, the motorcycle 1 has a front fork 21 as an example of a suspension apparatus which links the front wheel 2 to the vehicle main body 10. In addition, the motorcycle 1 has a rear suspension 22 which links the rear wheel 3 to the vehicle main body 10. In addition, the front fork 21 and the rear suspension 22 are an example of a changing device which changes a relative position of the vehicle main body 10 and axles of the front wheel 2 and the rear wheel 3.

The motorcycle 1 includes two brackets 14 and a shaft 15. The brackets 14 hold the front fork 21 disposed on the right side of the front wheel 2 and the front fork 21 disposed on the left side of the front wheel 2, and the shaft 15 is disposed between the two brackets 14. The shaft 15 is rotatably supported by the vehicle body frame 11.

The motorcycle 1 includes a control device 70 that controls the vehicle height of the motorcycle 1 by controlling a front wheel side flow path switching unit 300 that will be described later of the front fork 21.

Configuration of Front Fork 21

Hereinafter, the front fork 21 will be described in detail.

Figure 2:
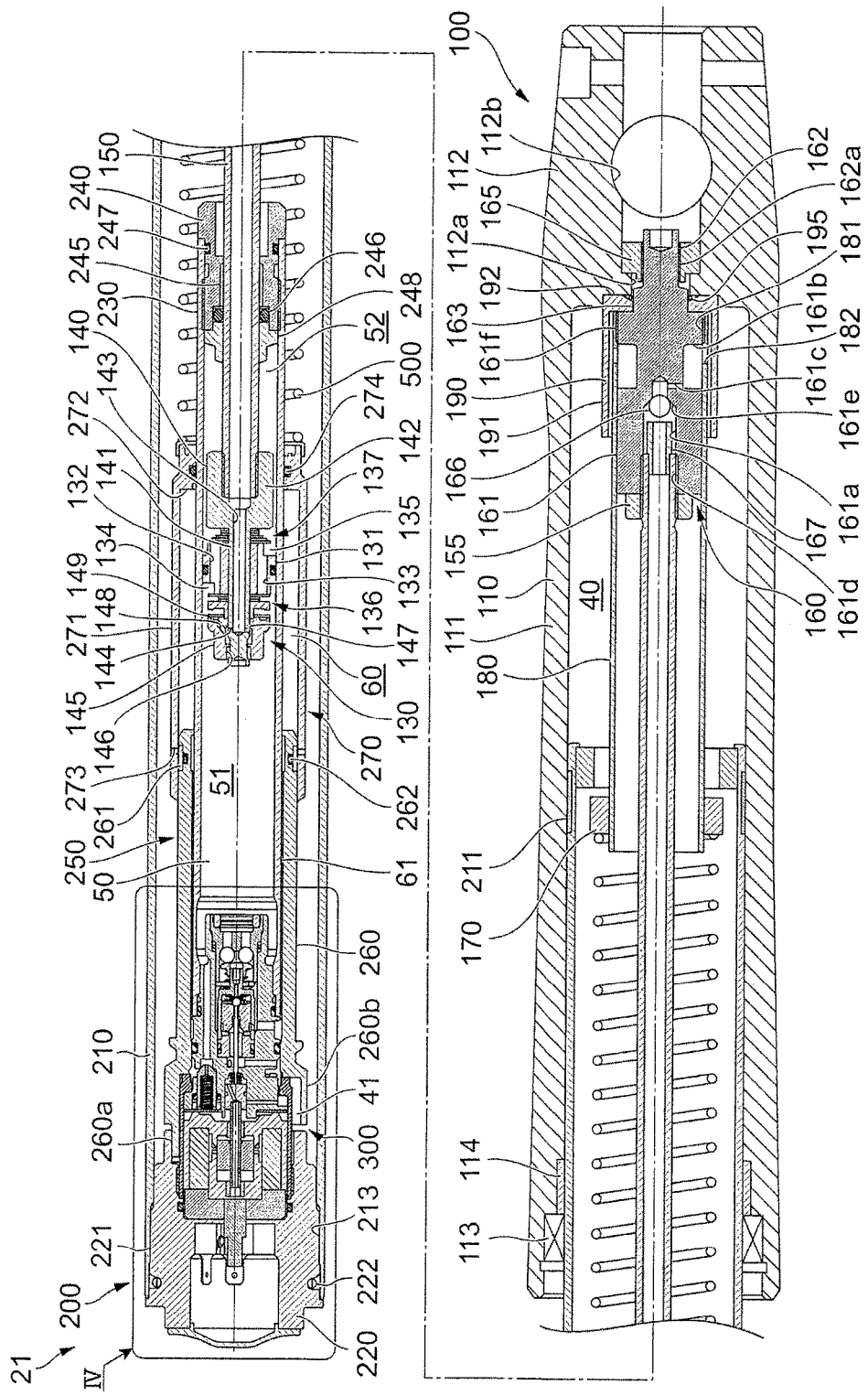
FIG. 2 is a sectional view of a front fork according to the embodiment.

FIG. 2 is a sectional view of the front fork 21 according to the embodiment.

The front fork 21 according to the embodiment is a so-called upright front fork that is disposed between the vehicle main body 10 and the front wheel 2 of the motorcycle 1, and supports the front wheel 2 side, and in which an outer member 110 (which will be described later) is disposed close to the front wheel 2, and an inner tube 210 is disposed close to the vehicle main body 10 side.

The front fork 21 includes an axle side unit 100 and a main body side unit 200. The axle side unit 100 has the outer member 110, and is attached to the axle of the front wheel 2, and the main body side unit 200 has the inner tube 210, and is attached to the vehicle main body 10. The front fork 21 includes a front wheel side spring 500 which is disposed between the axle side unit 100 and the main body side unit 200 such that the front wheel side spring 500 absorbs vibration which is applied to the front wheel 2 due to roughness of a road surface.

The outer member 110 and the inner tube 210 are cylindrical members which are coaxially disposed, and hereinafter, a direction (axial direction) of a center line of this circular cylinder may be referred to as a "vertical direction". In the embodiment, an "upper" side represents a region in which the vehicle main body 10 is disposed, and a "lower" side represents a region in which the front wheel 2 is disposed. The axle side unit 100 and the main body side unit 200 move relatively to each other in the vertical direction (axial direction) such that the front fork 21 absorbs and suppresses vibration induced by roughness of a road surface while supporting the front wheel 2.

Configuration of Axle Side Unit 100

The axle side unit 100 includes the outer member 110 that is attached to the axle of the front wheel 2, a damping force generation unit 130 that generates a damping force using the viscous resistance of oil, a rod 150 that holds the damping force generation unit 130, and a rod holding member 160 that holds a lower end portion of the rod 150.

The axle side unit 100 includes a spherical ball 166 that is inserted into an axial recess portion 161a (which will be described later) of the rod holding member 160, and a restricting member 167 that restricts a movement of the ball 166.

The axle side unit 100 includes a spring support member 170 that supports a lower end portion of the front wheel side spring 500; a support-member holding member 180 that holds the spring support member 170; and a guide member 190 that guides an axial movement of the inner tube 210.

Configuration of Outer Member 110

The outer member 110 has a cylindrical portion 111 having a cylindrical shape into which the inner tube 210 is inserted, and an axle bracket portion 112 to which the axle of the front wheel 2 can be attached.

The cylindrical portion 111 has an oil seal 113 and a slide bush 114 in an upper end portion thereof. The oil seal 113 seals a gap between the outer circumferential surface of the inner tube 210 and the cylindrical portion 111, and the slide bush 114 helps the cylindrical portion to smoothly slide against the outer circumferential surface of the inner tube 210.

An axial through-hole 112a and an axle mounting hole 112b are formed in the axle bracket portion 112. The rod holding member 160 is inserted into the axial through-hole 112a in the axial direction, and the axle of the front wheel 2 can pass through in the direction which intersects with the axial direction and be attached to the axle mounting hole 112b.

Configuration of Damping Force Generation Unit 130

The damping force generation unit 130 includes a piston 131 that partitions off a working oil chamber 50 which is formed in the internal space of a cylinder 230 (which will be described later); an upper end side valve 136 that is provided at an upper end of the piston 131; and a lower end side valve 137 that is provided on a lower end side of the piston 131. The damping force generation unit 130 includes a piston bolt 140 that supports the piston 131, the upper end side valve 136, the lower end side valve 137, and the like, and a nut 145 that positions the piston 131, the upper end side valve 136, the lower end side valve 137, and the like by being tightened to the piston bolt 140.

The piston 131 is a cylindrical member, and a seal member for sealing the gap between the cylinder 230 and the piston 131 is provided on the outer circumferential surface of the piston 131. The piston 131 is formed with a first through-hole 132 and a second through-hole 133 which are axial through-holes. The piston 131 is formed with a first radial communication path 134 and a second radial communication path 135. The first radial communication path 134 is formed in an upper end portion of the piston 131 in such a way as to extend in a radial direction, and communicates with the first through-hole 132. The second radial communication path 135 is formed in a lower end portion of the piston 131 in such a way as to extend in the radial direction, and communicates with the second through-hole 133. A plurality of (for example, three) the first through-holes 132 and a plurality of (for example, three) the second through-holes 133 are formed in a circumferential direction, and the first radial communication path 134 and the second radial communication path 135 are positioned so as to correspond to the first through-hole 132 and the second through-hole 133, respectively.

The upper end side valve 136 is configured with a single disk-shaped metal plate or a plurality of disk-shaped metal plates which are stacked. A through-hole is formed at the center of each of the metal plates of the upper end side valve 136, and a shaft portion 141 (which will be described later) of the piston bolt 140 passes through the through-holes. The upper end side valve 136 blocks the second through-hole 133, and opens the first through-hole 132.

The lower end side valve 137 is formed by stacking a plurality of disk-shaped metal plates. A through-hole is formed at the center of each of the metal plates of the lower end side valve 137, and the shaft portion 141 (which will be described later) of the piston bolt 140 passes through the through-holes. The lower end side valve 137 blocks the first through-hole 132, and opens the second through-hole 133.

The piston bolt 140 has a columnar shaft portion 141 that is provided at an upper end of the piston bolt 140, and a columnar base portion 142 that is provided on a lower end side of the piston bolt 140, and has a radius which is greater than the radius of the shaft portion 141. The piston bolt 140 is formed with a recess portion 143 that is recessed from a lower end surface of the base portion 142 toward the shaft portion 141. In addition, the base portion 142 of the piston bolt 140 may have, for example, a shape of a hexagonal column or a shape of a prism.

An upper end portion of the shaft portion 141 is formed with a male screw that is tightened to a female screw formed on the nut 145.

The inner circumferential surface of a lower end portion of the recess portion 143 is formed with a female screw that is tightened to a male screw formed on an upper end portion of the rod 150. A radial through-hole 144 is radially formed in an upper end portion of the recess portion 143 so that the outer side of the shaft portion 141 can communicate with the recess portion 143.

An upper end portion of the nut 145 is formed with a female screw 146 to which a male screw of the piston bolt 140 is tightened, and a columnar recess portion 147 is recessed from a lower end surface of the nut 145, is formed below the female screw 146, and has a radius which is greater than the minor radius of the female screw 146. In addition, the nut 145 is formed with an inclination direction through-hole 148. The inclination direction through-hole 148 penetrates in the direction of being inclined in the axial direction to communicate with the outer portion of the nut 145 and the recess portion 147. In addition, a plate valve 149 which covers an opening portion in the inclination direction through-hole 148 is provided on a lower end side of the nut 145.

The damping force generation unit 130 configured as described above is held by the rod 150 by tightening the male screw formed on the upper end portion of the rod 150 to the female screw formed on the recess portion 143 of the piston bolt 140. The piston 131 is in contact with the inner circumferential surface of the cylinder 230 via the seal member that is provided on the outer circumferential surface of the piston 131, and the piston 131 partitions off the internal space of the cylinder 230 into a first oil chamber 51 (which is disposed above the piston 131) and a second oil chamber 52 (which is disposed below the piston).

Configuration of Rod 150

The rod 150 is a cylindrical member, and male screws are respectively formed on the outer circumferential surfaces of the upper end portion and the lower end portions of the rod 150. The male screw formed on the upper end portion is tightened to the piston bolt 140 of the damping force generation unit 130, and the male screw formed on the lower end portion is tightened to a female screw 161d that is formed on an upper end side columnar portion 161 of the rod holding member 160. A lock nut 155 is tightened to the male screw that is formed on the lower end portion such that the rod 150 is fixed to the rod holding member 160.

A female screw may be formed on the inner circumferential surface of the lower end portion of the rod 150.

Configuration of Rod Holding Member 160

The rod holding member 160 has a plurality of columnar portions which have different diameters, and specifically, the rod holding member 160 has the upper end side columnar portion 161 that is an upper end portion, a lower end side columnar portion 162 that is a lower end portion, and an intermediate columnar portion 163 that is disposed between the upper end side columnar portion 161 and the lower end side columnar portion 162.

The upper end side columnar portion 161 is formed with the axial recess portion 161a, a radial recess portion 161b, and a radial through-hole 161c. The axial recess portion 161a is axially recessed from the upper end surface of the upper end side columnar portion 161. The radial recess portion 161b is radially recessed from the outer circumferential surface of the upper end side columnar portion 161 across the entire circumference thereof. The radial through-hole 161c radially penetrates the axial recess portion 161a and the radial recess portion 161b.

The axial recess portion 161a is formed with the female screw 161d that is tightened to the male screw formed on the lower end portion of the rod 150. The axial recess portion 161a is formed with an inclined surface 161e which is inclined with respect to the axial direction such that the inner diameter of the axial recess portion 161a decreases gradually toward the lower side.

A lower end portion of the upper end side columnar portion 161 is formed with a male screw 161f that is tightened to a female screw 181 (which will be described later) which is formed on the support-member holding member 180.

The intermediate columnar portion 163 has a diameter that is smaller than the inner diameter of the axial through-hole 112a which is formed in the outer member 110, and the intermediate columnar portion 163 is fitted into the axial through-hole 112a of the outer member 110.

A male screw 162a is formed on the outer circumferential surface of the lower end side columnar portion 162.

The male screw 162a formed on the lower end side columnar portion 162 is tightened to a nut 165 which is inserted into the axial through-hole 112a of the outer member 110, and thus, the rod holding member 160 is fixed to the outer member 110.

Configuration of Restricting Member 167

The restricting member 167 is a stepped member which is formed in the cylindrical shape. A male screw is formed on the outer circumferential surface of an upper end portion of the restricting member 167. A female screw formed on the inner circumferential surface of the lower end portion of the rod 150 is tightened to this male screw such that the restricting member 167 is fixed to the rod 150. A lower end portion of the restricting member 167 restricts a movement of the ball 166 that is inserted into the axial recess portion 161a of the rod holding member 160.

Configuration of Spring Support Member 170

The spring support member 170 is a cylindrical member, and is fixed to an upper end portion of the support-member holding member 180. Fixing by welding, press-fitting, or using a stopper ring can be used as a fixing method.

Configuration of Support-Member Holding Member 180

The support-member holding member 180 is a cylindrical member. The lower end portion of the support-member holding member 180 is formed with the female screw 181 that is tightened to the male screw 161f which is formed on the rod holding member 160. The male screw 161f formed on the rod holding member 160 is tightened to the female screw 181 such that the support-member holding member 180 is fixed to the rod holding member 160. In addition, the support-member holding member 180 and the rod holding member 160 may be fixed by using the stopper ring.

A communication hole 182 is formed in the support-member holding member 180 such that the inside and the outside of the support-member holding member 180 communicate with each other, and the communication hole 182 is disposed at an axial position which correspond to the position of the radial recess portion 161b of the rod holding member 160.

Configuration of Guide Member 190

The guide member 190 has a cylindrical portion 191 having a cylindrical shape, and an inward portion 192 that is formed to be radially oriented toward the inner side from a lower end portion of the cylindrical portion 191.

The inward portion 192 is interposed between the rod holding member 160 and the outer member 110 such that the guide member 190 is fixed between the rod holding member 160 and the outer member 110.

A chamfer is formed in a lower end portion of the inward portion 192, and a seal member 195, such as an O-ring, is fitted into a space which is formed between the chamfer and the rod holding member 160. The seal member 195 seals the gap between the guide member 190, the rod holding member 160, and the outer member 110. Accordingly, the inner space of the cylindrical portion 111 of the outer member 110 is held in a liquid tight manner.

In the axle side unit 100 configured as described above, a reservoir chamber 40 is formed between (i) the inner circumferential surface of the outer member 110 and (ii) the outer circumferential surfaces of the rod 150 and the support-member holding member 180. The reservoir chamber 40 stores oil that is sealed in the front fork 21.

Configuration of Main Body Side Unit 200

The main body side unit 200 includes the cylindrical inner tube 210, both ends of which are opened, and a cap 220 that is attached to an upper end portion of the inner tube 210.

The main body side unit 200 includes the cylinder 230 having a cylindrical shape, and a seal member 240 that is attached to a lower end portion of the cylinder 230, and seals the inner space of the cylinder 230.

The main body side unit 200 includes a front wheel side spring-length changing unit 250 and the front wheel side flow path switching unit 300. The front wheel side spring-length changing unit 250 supports an upper end portion of the front wheel side spring 500, and adjusts (changes) the length of the front wheel side spring 500, and the front wheel side flow path switching unit 300 is attached to an upper end portion of the cylinder 230, and switches a flow path of oil as an example of a fluid.

Configuration of Inner Tube 210

The inner tube 210 is a cylindrical member.

The inner tube 210 includes a cylindrical slide bush 211 which helps the inner tube 210 to smoothly slide against the inner circumferential surface of the cylindrical portion 111 of the outer member 110 in the lower end portion.

The upper end portion of the inner tube 210 is formed with a female screw 213 which is tightened to a male screw 221 (which will be described later) that is formed on the cap 220.

Configuration of Cap 220

The cap 220 is a substantially cylindrical member. The outer circumferential surface of the cap 220 is formed with the male screw 221 that is tightened to the female screw 213 which is formed on the inner tube 210, and the inner circumferential surface of the cap 220 is formed with a female screw which is tightened to male screw that is formed on the front wheel side spring-length changing unit 250 or the front wheel side flow path switching unit 300. The cap 220 is attached to the inner tube 210, and holds the front wheel side spring-length changing unit 250 and the front wheel side flow path switching unit 300.

The cap 220 has a seal member 222, such as an O-ring, that holds the inner space of the inner tube 210 in a liquid tight manner.

Configuration of Cylinder 230

The cylinder 230 is a cylindrical member. The outer circumferential surface of the upper end portion of the cylinder 230 is formed with a female screw that is tightened to a male screw formed on the front wheel side flow path switching unit 300, and the inner circumferential surface of the lower end portion of the cylinder 230 is formed with a female screw that is tightened to a male screw which is formed on the seal member 240.

Configuration of Seal Member 240

The seal member 240 is a cylindrical member. The outer circumferential surface of the seal member 240 is formed with a male screw that is tightened to the female screw formed on the inner circumferential surface of the lower end portion of the cylinder 230. The female screw formed on the inner circumferential surface of the lower end portion of the cylinder 230 is tightened to this male screw such that the seal member 240 is held by the cylinder 230.

The seal member 240 has a slide bush 245 on the inner circumference, and the slide bush 245 helps the outer circumferential surface of the rod 150 to smoothly slide against the seal member 240. The seal member 240 has a seal member 246, such as an O-ring, that is disposed between the seal member 240 and the outer circumferential surface of the rod 150, and a seal member 247, such as an O-ring, that is disposed between the seal member 240 and the inner circumferential surface of the cylinder 230, and as a result, the inner space of the cylinder 230 is held in a liquid tight manner.

A shock absorbing member 248 is attached to an upper end portion of the seal member 240, and absorbs shock that is applied when the damping force generation unit 130 comes into contact with the shock absorbing member 248. The shock absorbing member 248 can be formed as an elastic member made of resin or rubber.

Configuration of Front Wheel Side Spring-Length Changing Unit 250

The front wheel side spring-length changing unit 250 includes a base member 260 and an upper end portion support member 270. The base member 260 is fixed to the cap 220, and the upper end portion support member 270 supports the upper end portion of the front wheel side spring 500, and changes the length of the front wheel side spring 500 by moving relatively to the base member 260 in the axial direction.

The base member 260 is a substantially cylindrical member. A protrusion portion 260a is formed in an upper end portion of the base member 260. The protrusion portion 260a is fixed to the cap 220.

However, the upper end portion of the base member 260 is formed with a protrusion portion 260b of which a part in the circumferential direction protrudes in the radial direction. The upper end portion of the base member 260 forms a flow path 41 for discharging oil in the cylinder 230 to the reservoir chamber 40 between the inner surface of the protrusion portion 260b and the outer circumferential surface of a lower end portion of a support member 400 (which will be described later).

The base member 260 has a cylindrical slide bush 261 and a seal member 262, such as an O-ring, in a lower end portion of the base member 260. The slide bush 261 is fitted to the outer circumference of the base member 260, and helps the base member 260 to smoothly slide against the inner circumferential surface of the upper end portion support member 270, and the O-ring is provided inside the slide bush 261. An annular flow path 61 is formed between the inner circumferential surface of the base member 260 and the outer circumferential surface of the cylinder 230.

The upper end portion support member 270 has a cylindrical portion 271 having a cylindrical shape, and an inward portion 272 that is formed to be radially oriented toward the inner side from a lower end portion of the cylindrical portion 271. The upper end portion support member 270 forms a jack chamber 60 in a space between the outer circumferential surface of the cylinder 230 and the lower end portion of the base member 260, and the jack chamber 60 accommodates oil used to change the position of the upper end portion support member 270 with respect to the base member 260.

The inner diameter of the cylindrical portion 271 is set to be smaller than the outer diameter of the slide bush 261 that is fitted to the base member 260. A radial through-hole 273 is radially formed in the cylindrical portion 271 so that the inside and the outside of the cylindrical portion 271 communicate with each other. Oil is discharged from the jack chamber 60 to the reservoir chamber 40 via the radial through-hole 273 such that the amount of movement of the upper end portion support member 270 with respect to the base member 260 is restricted.

A seal member 274, such as an O-ring, is provided on the inner circumference side of the inward portion 272, and holds the jack chamber 60 in a liquid tight manner by sealing the gap between the inward portion 272 and the outer circumferential surface of the cylinder 230.

Oil in the cylinder 230 is supplied to the jack chamber 60 via the annular flow path 61 that is formed between the inner circumferential surface of the base member 260 and the outer circumferential surface of the cylinder 230. A detailed description thereof will be given later.

Configuration of Front Wheel Side Flow Path Switching Unit 300

Figure 3A:
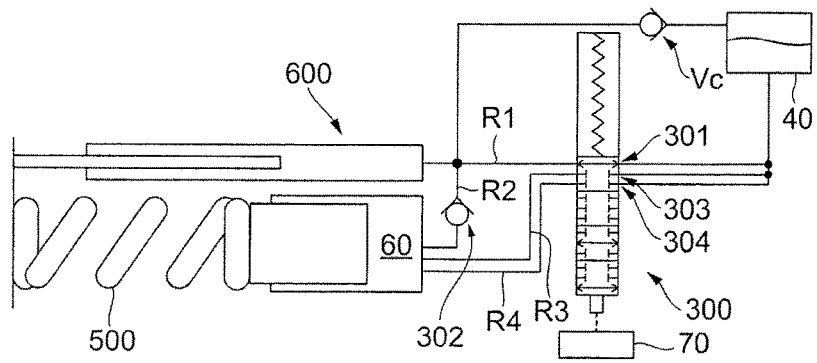
FIG. 3A is a view schematically illustrating an open and closed state of a flow path in a case where a front wheel side flow path switching unit is in a first switch state.
Figure 3B:
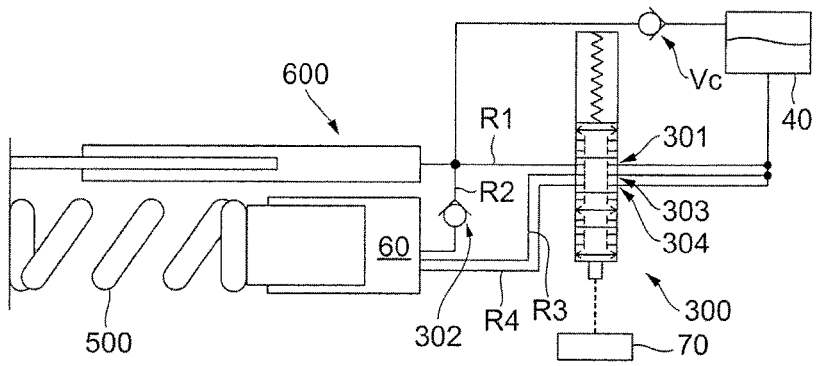
FIG. 3B is a view schematically illustrating an open and closed state of the flow path in a case where the front wheel side flow path switching unit is in a second switch state.
Figure 3C:
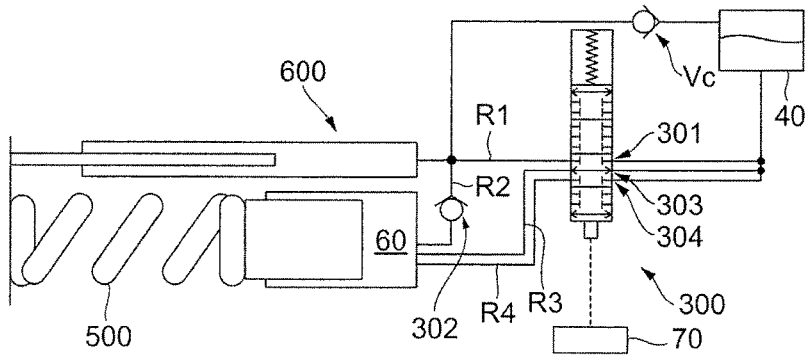
FIG. 3C is a view schematically illustrating an open and closed state of the flow path in case where the front wheel side flow path switching unit is in a third switch state.
Figure 3D:
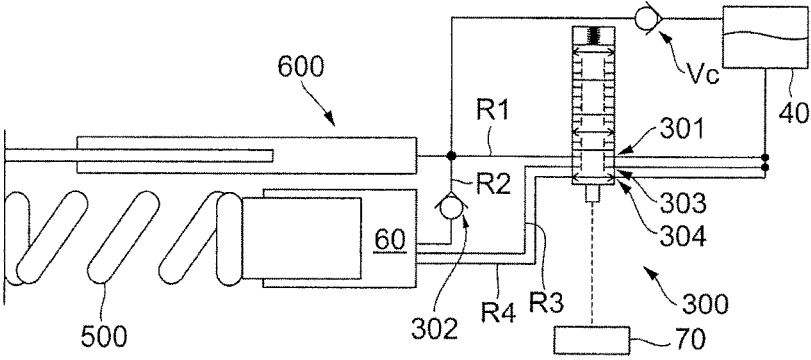
FIG. 3D is a view schematically illustrating an open and closed state of the flow path in case where the front wheel side flow path switching unit is in a fourth switch state.

FIG. 3A is a view schematically illustrating an open and closed state of the flow path in a case where the front wheel side flow path switching unit 300 is in a first switch state (which will be described later). FIG. 3B is a view schematically illustrating an open and closed state of the flow path in a case where the front wheel side flow path switching unit 300 is in a second switch state (which will be described later). FIG. 3C is a view schematically illustrating an open and closed state of the flow path in case where the front wheel side flow path switching unit 300 is in a third switch state (which will be described later). FIG. 3D is a view schematically illustrating an open and closed state of the flow path in case where the front wheel side flow path switching unit 300 is in a fourth switch state (which will be described later).

The front wheel side flow path switching unit 300 is a device which switches supply of oil discharged by a pump 600 (which will be described later) to the reservoir chamber 40, supply of oil discharged by the pump 600 to the jack chamber 60, or supply of oil accommodated in the jack chamber 60 to the reservoir chamber 40.

The front wheel side flow path switching unit 300 is formed with a first communication path R1 which communicates with the inside of the cylinder 230 and the reservoir chamber 40, a second communication path R2 which communicates with the inside of the cylinder 230 and the jack chamber 60, and a third communication path R3 and a fourth communication path R4 which communicate with the jack chamber 60 and the reservoir chamber 40.

In addition, the front wheel side flow path switching unit 300 includes a first on-off valve 301 which opens and closes the first communication path R1, a second on-off valve 302 which opens and closes the second communication path R2, a third on-off valve 303 which opens and closes the third communication path R3, and a fourth on-off valve 304 which opens and closes the fourth communication path R4.

In a case where the front wheel side flow path switching unit 300 is in the first switch state, as illustrated in FIG. 3A, the first on-off valve 301 is open and the third on-off valve 303 and the fourth on-off valve 304 are closed, and thus, the oil discharged by the pump 600 reaches the reservoir chamber 40 via the first communication path R1. In this case, since the pressure of the oil discharged by the pump 600 is not as high as the second on-off valve 302 is opened, the oil does not circulate in the second communication path R2. In other words, since the first on-off valve 301 is open, the second on-off valve 302 is closed. In addition, in the first switch state, an amount of oil in the jack chamber 60 neither increases nor decreases.

In a case where the front wheel side flow path switching unit 300 is in the second switch state, as illustrated in FIG. 3B, the first on-off valve 301, the third on-off valve 303, the fourth on-off valve 304 are closed, and thus, the oil discharged by the pump 600 opens the second on-off valve 302 and reaches the jack chamber 60 via the second communication path R2. In the second switch state, the amount of oil in the jack chamber 60 increases. Therefore, the jack chamber 60 extends.

In a case where the front wheel side flow path switching unit 300 is in the third switch state, as illustrated in FIG. 3C, the first on-off valve 301 and the fourth on-off valve 304 are closed, the third on-off valve 303 is open, and thus, the oil in the jack chamber 60 reaches the reservoir chamber 40 via the third communication path R3. In the third switch state, an amount of oil in the jack chamber 60 decreases. Therefore, the jack chamber 60 contracts.

In a case where the front wheel side flow path switching unit 300 is in the fourth switch state, as illustrated in FIG. 3D, the first on-off valve 301 and the third on-off valve 303 are closed, the fourth on-off valve 304 is open, and thus, the oil in the jack chamber 60 reaches the reservoir chamber 40 via the fourth communication path R4. As will be described later, a flow path area of the fourth communication path R4 is wider than a flow path area of the third communication path R3, in the fourth switch state, an amount of oil in the jack chamber 60 decreases faster than that of the third switch state. Therefore, the jack chamber 60 rapidly contracts.

Specific Configuration of Front Wheel Side Flow Path Switching Unit 300

Figure 4:
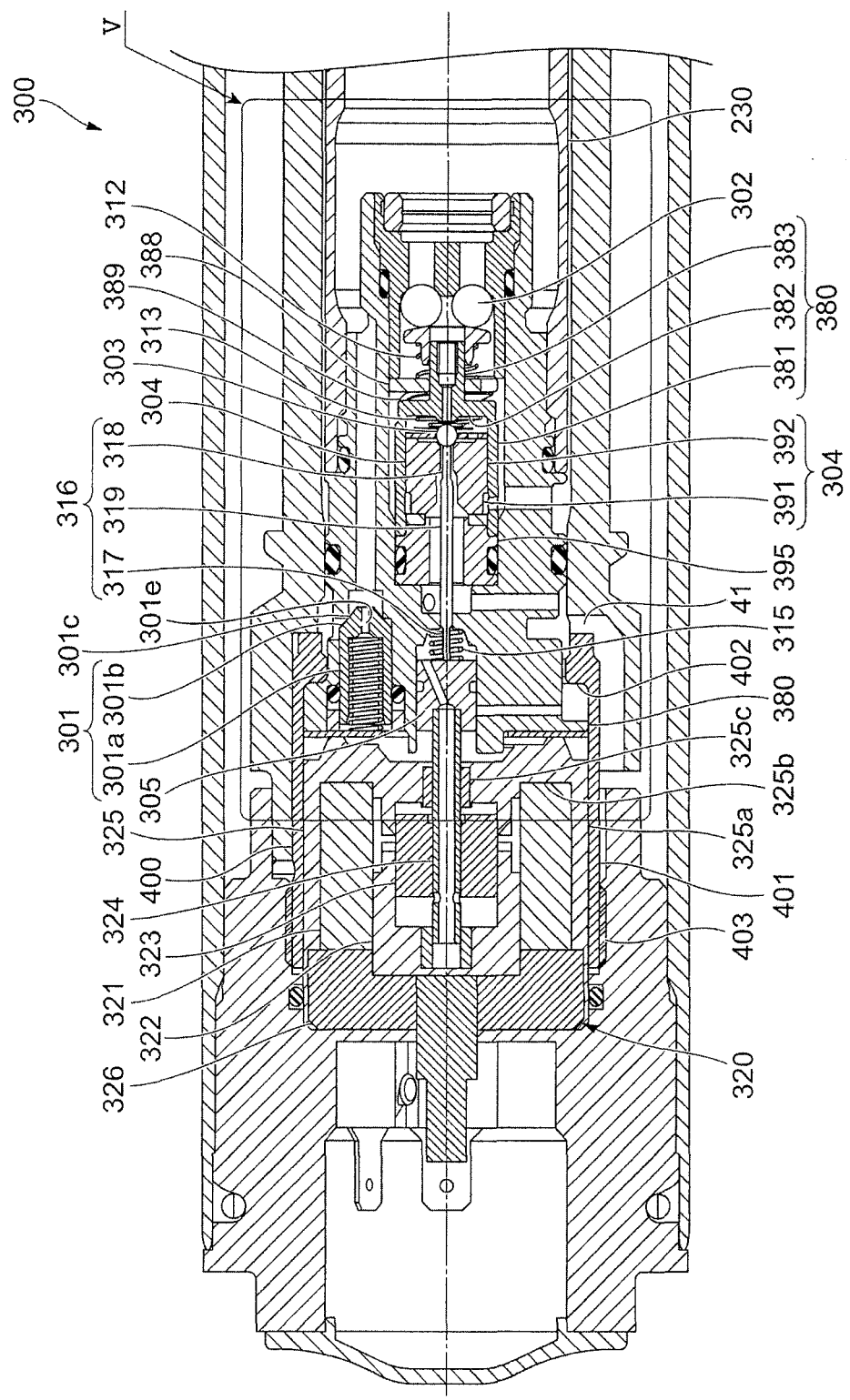
FIG. 4 is an enlarged view of a portion IV in FIG. 2.
Figure 5:
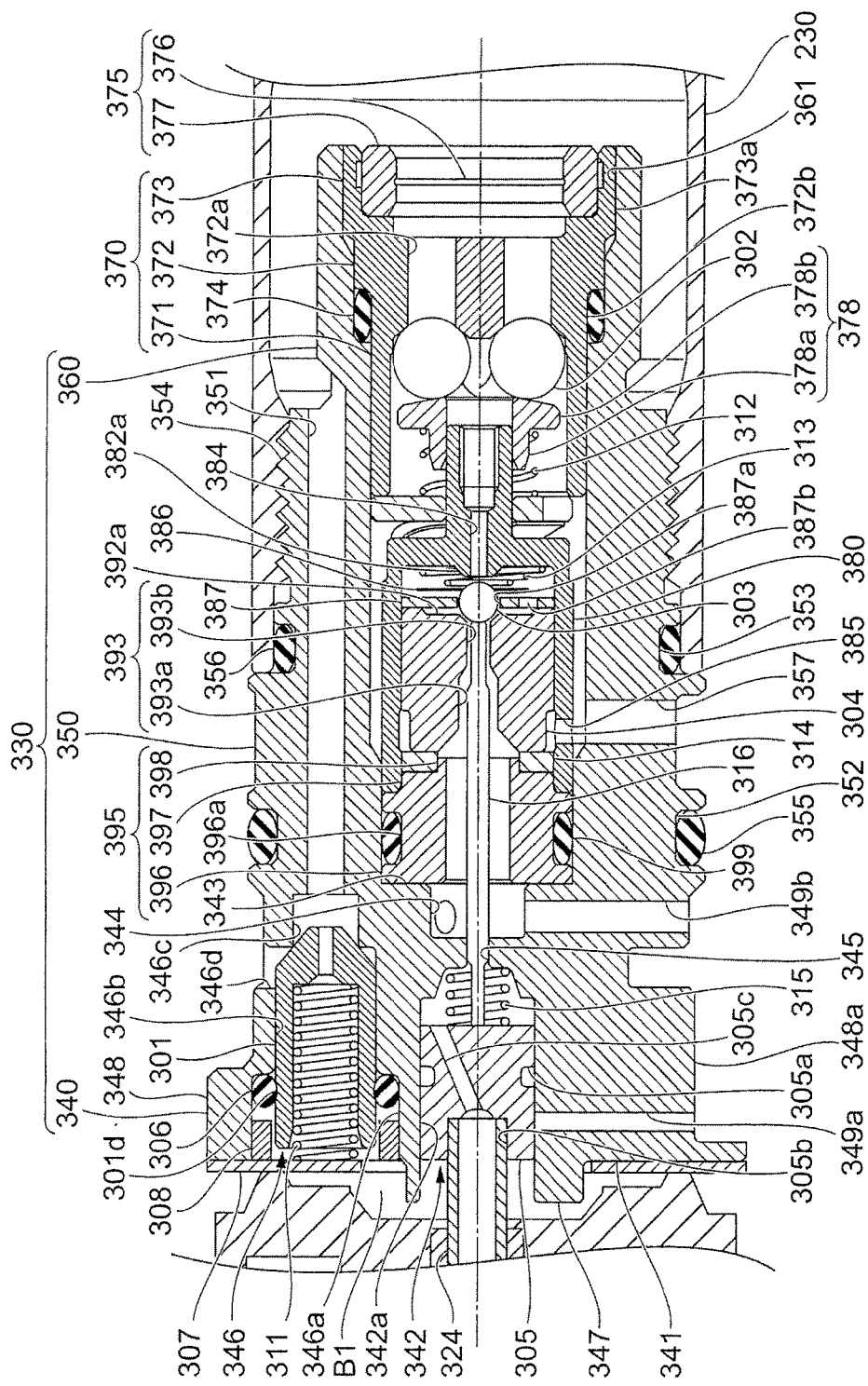
FIG. 5 is an enlarged view of a portion V in FIG. 4.

FIG. 4 is an enlarged view of a portion IV in FIG. 2.
FIG. 5 is an enlarged view of a portion V in FIG. 4.

The front wheel side flow path switching unit 300 includes a first coil spring 311 which gives a force in the direction in which the first communication path R1 is closed with respect to the first on-off valve 301, a second coil spring 312 which gives a force in the direction in which the second communication path R2 is closed with respect to the second on-off valve 302, and a third coil spring 313 which gives a force in the direction in which the third communication path R3 is closed with respect to the third on-off valve 303.

In addition, the front wheel side flow path switching unit 300 includes a control valve 305 which controls opening and closing of the first on-off valve 301, a control valve coil spring 315 which is provided below the control valve 305, and a front wheel side solenoid 320 which moves the control valve 305 downward against a spring force of the control valve coil spring 315.

In addition, the front wheel side flow path switching unit 300 includes a push rod 316 which moves the third on-off valve 303 downward against a spring force of the third coil spring 313 provided below the third on-off valve 303. The push rod 316 moves downward being pushed by the control valve 305.

In addition, the front wheel side flow path switching unit 300 includes a unit main body 330 and a second on-off valve support member 370 which is mounted on the unit main body 330 and supports the second on-off valve 302. In addition, the front wheel side flow path switching unit 300 includes a fourth on-off valve support member 380 which supports the fourth on-off valve 304, and a cover member 395 which covers an opening portion of the fourth on-off valve support member 380. In addition, the front wheel side flow path switching unit 300 includes a coil spring support member 388 and a leaf spring 389 which are disposed between the second on-off valve support member 370 and an inward portion 382 (which will be described later) of the fourth on-off valve support member 380, and support an upper end portion of the second coil spring 312.

Regarding First On-Off Valve 301

The first on-off valve 301 includes a cylindrical portion 301a having a cylindrical shape and a conical portion 301b having a conical shape and having an inclined surface 301c which is inclined with respect to the axial direction such that the outer diameter thereof gradually decreases toward the lower side.

A seal member 306, such as an O-ring, is fitted to a space between an outer circumferential surface 301d of the cylindrical portion 301a and an upper end side columnar portion 340 (which will be described later) of the unit main body 330.

A through-hole 301e in the axial direction is formed in a center portion of the conical portion 301b. The through-hole 301e communicates with the inner portion of the cylindrical portion 301a and the outer portion of the conical portion 301b. The through-hole 301e communicates with an axial communication hole 351 (which will be described later) of the unit main body 330, and a space (hereinafter, referred to as "first on-off valve back pressure chamber B1") in which the oil that gives a downward force with respect to the first on-off valve 301 exists. In addition, the first on-off valve back pressure chamber B1 is a space surrounded by a lower end surface of a case 325 of the front wheel side solenoid 320 which will be described later, a spring support member 307, a center protrusion 347 of the unit main body 330, or the like.

The first coil spring 311 is disposed on an inner side of the cylindrical portion 301a of the first on-off valve 301, and the lower end portion is supported on an upper end surface of the conical portion 301b of the first on-off valve 301.

The front wheel side flow path switching unit 300 includes a spring support member 307 which supports an upper end portion of the first coil spring 311, and a retaining ring 308 which suppresses upward movement of the seal member 306.

The retaining ring 308 has a cylindrical shape, and an inner diameter thereof is greater than an outer diameter of the cylindrical portion 301a of the first on-off valve 301. An outer diameter of the retaining ring 308 is greater than an inner diameter of a first columnar recess portion 346a of the upper end side columnar portion 340 (which will be described later) of the unit main body 330, and is pressurized to the first columnar recess portion 346a. In addition, the retaining ring 308 suppresses the upward movement of the seal member 306. In addition, the retaining ring 308 may be formed to be integrated with the upper end side columnar portion 340.

The spring support member 307 is a doughnut-shaped thin plate a center portion of which is formed with a through-hole having a diameter that is greater than an outer diameter of the center protrusion 347 (which will be described later) of the unit main body 330. The spring support member 307 is disposed above the first on-off valve 301, the first coil spring 311, the seal member 306, and the retaining ring 308, and suppresses upward movement of the first on-off valve 301 and the first coil spring 311.

Configuration of Fourth On-Off Valve 304

The fourth on-off valve 304 includes a first columnar portion 391 and a second columnar portion 392 which have columnar shapes and which have different diameters from each other. A diameter of the first columnar portion 391 is smaller than a diameter of the second columnar portion 392.

In addition, an axial through-hole 393 which penetrates in the axial direction is formed in the fourth on-off valve 304. The axial through-hole 393 includes a first through-hole 393a and a second through-hole 393b which have a columnar shape and have different diameters from each other. A hole diameter d1 of the first through-hole 393a is greater than a hole diameter d2 of the second through-hole 393b. The hole diameter d2 of the second through-hole 393b is greater than a diameter of a second shaft portion 318 (which will be described later) of the push rod 316, and the hole diameter d1 of the first through-hole 393a is greater than a diameter of a third shaft portion 319 (which will be described later) of the push rod 316 such that the push rod 316 passes through the inside of the axial through-hole 393. However, in order to suppress the downward movement of the push rod 316, the hole diameter d2 of the second through-hole 393b is greater than the diameter of the third shaft portion 319 of the push rod 316.

The second columnar portion 392 is formed with a lower end side recess portion 392a which is recessed from the lower end surface. In an opening portion of the second through-hole 393b in the lower end side recess portion 392a, a recess portion which is along a shape of the upper end portion of the spherical third on-off valve 303 is formed.

Configuration of Control Valve 305

The control valve 305 is a columnar member. A groove 305a which is recessed across the entire circumference thereof is formed on an outer circumferential surface of the control valve 305. In addition, the control valve 305 is formed with an upper end side recess portion 305b and an inclined hole 305c. The upper end side recess portion 305b is recessed from the upper end surface in the axial direction. The inclined hole 305c is inclined with respect to the axial direction to communicate with the upper end side recess portion 305b and a lower part of the control valve 305.

The control valve 305 moves downward against a spring force of the control valve coil spring 315 by being pressed downward by an operation rod 324 of the front wheel side solenoid 320 inserted into the upper end side recess portion 305b. Meanwhile, in a case where the operation rod 324 moves upward, the control valve 305 moves upward by the spring force of the control valve coil spring 315.

Configuration of Push Rod 316

As illustrated in FIG. 4, the push rod 316 includes a columnar first shaft portion 317 which is positioned on the upper end portion side, the columnar second shaft portion 318 which is positioned on the lower end portion side, and the columnar third shaft portion 319 which is positioned between the first shaft portion 317 and the second shaft portion 318. The diameter of the third shaft portion 319 is greater than the diameters of the first shaft portion 317 and the second shaft portion 318. In addition, the third on-off valve 303 and the push rod 316 may be integrated with each other.

Configuration of Front Wheel Side Solenoid 320

The front wheel side solenoid 320 is a proportional solenoid including a coil 321, a core 322 which is disposed on an inner side of the coil 321, a plunger 323 which is guided into the core 322, and the operation rod 324 which is linked to the plunger 323.

In addition, the front wheel side solenoid 320 includes the case 325 which accommodates the coil 321, the core 322, the plunger 323 and the like, and a cover 326 which covers an opening portion of the case 325.

The operation rod 324 is hollow, an upper end portion thereof is accommodated on the inside of the case 325, and a lower end portion thereof protrudes from the case 325.

The case 325 includes a cylindrical portion 325a having a cylindrical shape and an inward portion 325b which is formed to be oriented toward the inner side in the radial direction from the lower end portion in the cylindrical portion 325a. The inward portion 325b is formed with a through-hole which passes through the operation rod 324. A guide bush 325c which guides the movement of the operation rod 324 is fitted to the inward portion 325b.

A front wheel side solenoid 320 configured as described above is energized to the coil 321 via a connector mounted on the cap 220 and a lead line, and an axial thrust force is generated in the plunger 323 in accordance with an energization current. In addition, the operation rod 324 which is linked to the plunger 323 moves in the axial direction by the thrust force of the plunger 323. In the front wheel side solenoid 320 according to the embodiment, the axial thrust force is generated in the plunger 323 such that an amount of protrusion of the operation rod 324 from the case 325 increases as the energization current to the coil 321 increases.

In addition, an energization amount to the coil 321 is controlled by the control device 70.

Configuration of Unit Main Body 330

The unit main body 330 includes the columnar upper end side columnar portion 340 which is provided on the upper end side, and a first cylindrical portion 350 and a second cylindrical portion 360 which are provided below the upper end side columnar portion 340, have cylindrical shapes and have different outer diameters from each other.

An outer diameter of the upper end side columnar portion 340 is substantially the same as an outer diameter of the first cylindrical portion 350, and an outer diameter of the first cylindrical portion 350 is greater than an outer diameter of the second cylindrical portion 360.

An upper end side center recess portion 342, a lower end side center recess portion 344, a center communication hole 345 are formed in a center portion of the upper end side columnar portion 340. The upper end side center recess portion 342 is recessed downward from an upper end surface 341. The lower end side center recess portion 344 is recessed in the upward direction from a lower end surface 343. The center communication hole 345 communicates with the upper end side center recess portion 342 and the lower end side center recess portion 344.

Figure 6:
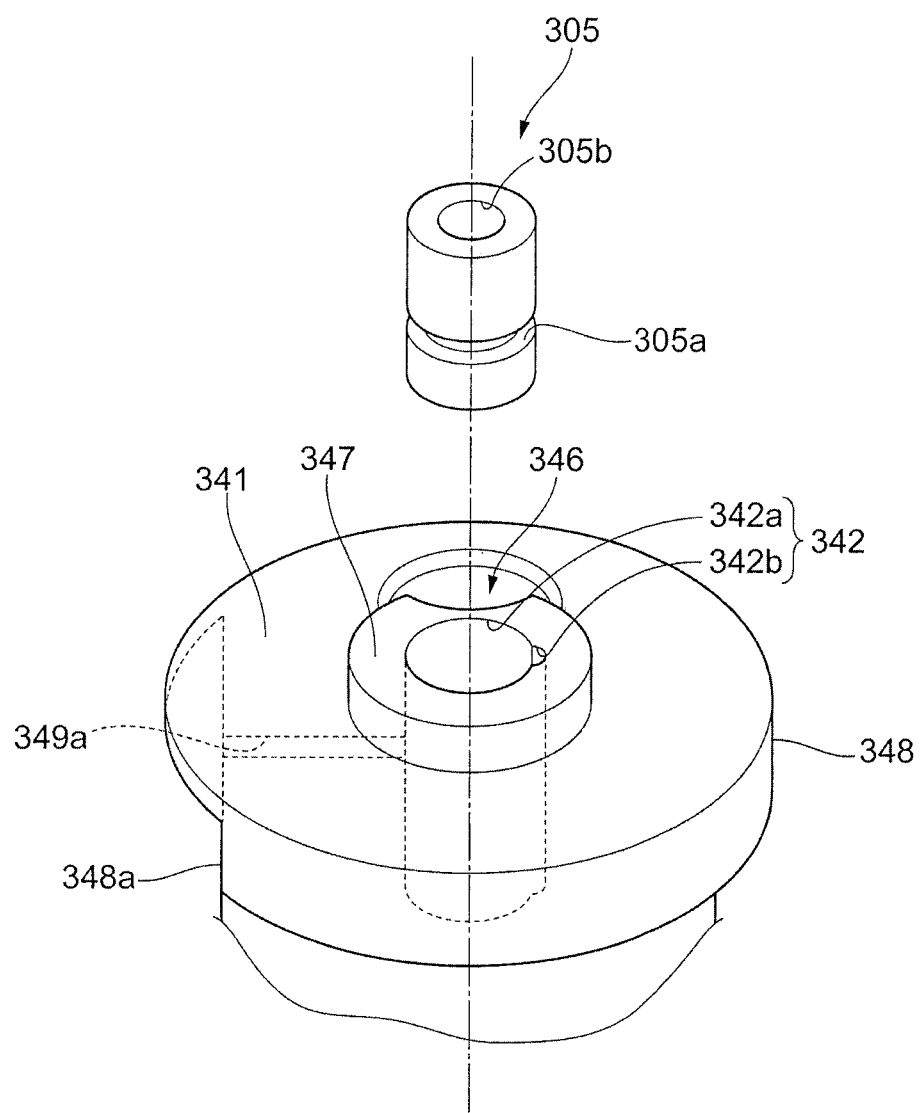
FIG. 6 is a perspective view of an upper end side columnar portion of a unit main body.

FIG. 6 is a perspective view of the upper end side columnar portion 340 of a unit main body 330.

The upper end side center recess portion 342 includes an accommodation portion 342a which accommodates the control valve 305 to be movable. In addition, the upper end side center recess portion 342 includes a side recess portion 342b which is recessed in the axial direction from an upper end surface of the center protrusion 347 (which will be described later) further to a part below a lower limit of a moving range of the control valve 305 so as to be continuous to the accommodation portion 342a in the radial direction which intersects with the axial direction.

In the upper end side columnar portion 340, an upper end side intermediate recess portion 346 is formed between the upper end side center recess portion 342 and the outer circumferential surface. The upper end side intermediate recess portion 346 is recessed downward from the upper end surface 341. The upper end side intermediate recess portion 346 includes three columnar recess portions including a first columnar recess portion 346a, a second columnar recess portion 346b, and a third columnar recess portion 346c which have columnar shapes and have different diameters from each other. In addition, the upper end side columnar portion 340 is formed with an intersecting-direction communication hole 346d which is a hole that communicates with the second columnar recess portion 346b and the outer portion in the direction which intersects with the axial direction.

In addition, in the center portion of the upper end side columnar portion 340, the center protrusion 347 which protrudes upward from the upper end surface 341 is provided around the upper end side center recess portion 342.

In addition, the upper end side columnar portion 340 includes a flange portion 348 which is oriented toward the outer side in the radial direction from the upper end portion. The flange portion 348 is formed with a cut-out portion 348a of which a part in the circumferential direction is cut out.

In addition, the upper end side columnar portion 340 is formed with a first radial communication hole 349a and a second radial communication hole 349b. The first radial communication hole 349a is a through-hole in the radial direction that communicates with the upper end side center recess portion 342 and the cut-out portion 348a. The second radial communication hole 349b is a through-hole in the radial direction that communicates with the lower end side center recess portion 344 and the outer portion.

One first radial communication hole 349a is formed at a position at which the side recess portion 342b of the upper end side center recess portion 342 is not formed, in the circumferential direction. In the embodiment, as illustrated in FIG. 6, the first radial communication hole 349a and the side recess portion 342b are formed on sides opposite to each other across a center line. The first radial communication hole 349a is a columnar hole, and an example in which a hole diameter thereof is the same as that of the groove 305a of the control valve 305 in the axial direction can be employed.

One or a plurality of the second radial communication holes 349b are formed at a part at which the upper end side intermediate recess portion 346 is not formed in the circumferential direction.

The axial communication hole 351 is formed in the first cylindrical portion 350. The axial communication hole 351 is a through-hole in the axial direction that communicates with (i) a space that is below the first cylindrical portion 350 and that is formed between the outer circumferential surface of the second cylindrical portion 360 and the inner circumferential surface of the cylinder 230 and (ii) the upper end side intermediate recess portion 346. One or a plurality of the axial communication holes 351 are formed in the circumferential direction.

A first radial recess portion 352, a second radial recess portion 353, and a male screw 354 are formed on the outer circumferential surface of the first cylindrical portion 350. The first radial recess portion 352 and the second radial recess portion 353 are recessed in the radial direction across the entire circumference thereof. The male screw 354 is tightened to a female screw formed in the upper end portion of the cylinder 230.

A seal member 355, such as an O-ring, which seals a gap between the first radial recess portion 352 and the base member 260 of the front wheel side spring-length changing unit 250 is fitted to the first radial recess portion 352.

A seal member 356, such as an O-ring, which seals a gap between the second radial recess portion 353 and the cylinder 230, is fitted to the second radial recess portion 353.

In addition, the first cylindrical portion 350 is formed with a third radial communication hole 357 which is a through-hole in the radial direction that communicates with the inner portion and the outer portion. A position in the radial direction of the third radial communication hole 357 is between the first radial recess portion 352 and the second radial recess portion 353.

A female screw 361 is formed in the lower end portion of the inner circumferential surface of the second cylindrical portion 360. A male screw 373a (which will be described later) formed on the outer circumferential surface of the second on-off valve support member 370 is tightened to the female screw 361.

Configuration of Second On-Off Valve Support Member 370

The second on-off valve support member 370 includes an upper end side cylindrical portion 371 which has a cylindrical shape and is positioned on the upper end portion side, a columnar portion 372 which is positioned in the center portion, and a lower end side cylindrical portion 373 which is positioned on the lower end portion side.

An outer diameter of the upper end side cylindrical portion 371 is smaller than the diameter of the inner circumferential surface of the first cylindrical portion 350 of the unit main body 330, and the upper end side cylindrical portion 371 is inserted into the first cylindrical portion 350 of the unit main body 330.

The columnar portion 372 is formed with a plurality of (three in the embodiment) axial through-holes 372a which penetrate in the axial direction at an equivalent interval in the circumferential direction around the center line. The opening portion on the upper end side in each of the axial through-holes 372a is formed with a recess portion which is along the shape of the lower end portion of the spherical second on-off valve 302. A groove 372b is formed on the outer circumferential surface of the columnar portion 372 across the entire circumference thereof. A seal member 374, such as an O-ring, which seals a gap between the groove 372b and the unit main body 330 is fitted to the groove 372b.

An inner circumferential surface of the lower end side cylindrical portion 373 is positioned on an outer side, in the radial direction, of the axial through-hole 372a formed in the columnar portion 372. The male screw 373a is formed on an outer circumferential surface of the lower end side cylindrical portion 373. The male screw 373a is tightened to the female screw formed in the lower end portion of the unit main body 330. A collecting member 375 is provided on an inner side of the lower end side cylindrical portion 373. The collecting member 375 collects dust of oil discharged by the pump 600 (which will be described later).

The second on-off valve support member 370 is mounted on the unit main body 330 as the male screw 373a formed on the outer circumferential surface of the lower end side cylindrical portion 373 is tightened to the female screw 361 formed in the unit main body 330. In addition, on the inner side of the upper end side cylindrical portion 371, three second on-off valves 302 which are disposed at an equivalent interval in the circumferential direction, and a second on-off valve pressing member 378 which presses the second coil spring 312 and three second on-off valves 302, are accommodated. The second on-off valve 302 blocks the axial through-hole 372a by seating in the opening portion on the upper end side in the axial through-hole 372a formed in the columnar portion 372.

Configuration of Collecting Member 375

The collecting member 375 includes a disk-shaped net 376 and a cylindrical holding member 377 which has a cylindrical shape and holds the net 376 on the inside thereof. The collecting member 375 is mounted on the lower end side cylindrical portion 373 as the holding member 377 is pressurized to the lower end side cylindrical portion 373. In addition, the collecting member 375 may be configured only of the net 376 that is directly attached to the lower end side cylindrical portion 373 of the second on-off valve support member 370, for example, by an adhesive. In addition, the collecting member 375 and the lower end side cylindrical portion 373 may be fixed by using the stopper ring.

Configuration of Second On-Off Valve Pressing Member 378

The second on-off valve pressing member 378 includes two cylindrical portions including a first cylindrical portion 378a and a second cylindrical portion 378b which have cylindrical shapes and have the same inner diameter and different outer diameters from each other. An inner diameter of the second on-off valve pressing member 378 is slightly greater than an outer diameter of a columnar portion 383 of the fourth on-off valve support member 380. The second on-off valve pressing member 378 moves in the axial direction while being supported by the columnar portion 383 of the fourth on-off valve support member 380.

An outer diameter of the first cylindrical portion 378a is smaller than an inner diameter of the second coil spring 312.

An outer diameter of the second cylindrical portion 378b is greater than the inner diameter of the second coil spring 312, and is smaller than an inner diameter of the upper end side cylindrical portion 371 of the second on-off valve support member 370. The second cylindrical portion 378b supports the lower end portion of the second coil spring 312 on the upper end surface.

A downward biasing force from the second coil spring 312 is applied to the second on-off valve pressing member 378, and the second on-off valve pressing member 378 is positioned at a position at which the lower end surface of the second cylindrical portion 378b comes into contact with three second on-off valves 302.

Configuration of Fourth On-Off Valve Support Member 380

The fourth on-off valve support member 380 includes a cylindrical portion 381 having a cylindrical shape, an inward portion 382 which is formed to be oriented toward the inner side in the radial direction from the lower end portion in the cylindrical portion 381, and a columnar portion 383 which is oriented downward from the lower end portion in the inward portion 382.

The fourth on-off valve support member 380 is formed with an axial through-hole 384 which penetrates the inward portion 382 and the columnar portion 383 in the axial direction. An inner portion of the cylindrical portion 381 and a part below the columnar portion 383 communicate with each other via the axial through-hole 384.

The fourth on-off valve support member 380 is formed with a radial communication hole 385 which is a through-hole in the radial direction that communicates with the cylindrical portion 381 and an outer side of the fourth on-off valve support member 380. A plurality of radial communication holes 385 are formed at an equivalent interval in the circumferential direction.

In the inward portion 382, a protrusion 382a which protrudes to an upper part in the axial direction from the upper end surface is provided. An opening portion of the axial through-hole 384 in the protrusion 382a is formed with a recess portion which is along the shape of the lower end portion of the third on-off valve 303.

In the cylindrical portion 381 of the fourth on-off valve support member 380, the fourth on-off valve 304, the third on-off valve 303, the third coil spring 313, a support member 386 which supports the upper end portion of the third coil spring 313, and a suppressing member 387 which suppresses the movement of the third on-off valve 303 in the radial direction, are accommodated.

The support member 386 is a doughnut-shaped thin plate a center portion of which is formed with a through-hole having a diameter that is smaller than a diameter of the third on-off valve 303. The support member 386 supports the upper end portion of the third coil spring 313 as a periphery of the through-hole of the center portion comes into contact with the upper end portion of the third coil spring 313. The downward movement of the third on-off valve 303 is suppressed by being fitted to the through-hole of the center portion of the support member 386. At a position at which a force which is generated to the support member 386 and moves the third on-off valve 303 downward and an upward force given from the third coil spring 313 are balanced, a position of the support member 386 is determined. In the embodiment, in a case where the third on-off valve 303 is not pressed from the push rod 316, the spring force of the third coil spring 313 is set such that the third on-off valve 303 blocks the opening portion of the second through-hole 393b of the fourth on-off valve 304. Meanwhile, in a case where the third on-off valve 303 is strongly pressed from the push rod 316, the spring force of the third coil spring 313 is set such that the third on-off valve 303 is mounted on the protrusion 382a of the inward portion 382 of the fourth on-off valve support member 380, and blocks the opening portion on the upper side of the axial through-hole 384 formed in the fourth on-off valve support member 380.

The suppressing member 387 is a doughnut-shaped thin plate a center portion of which is formed with a center through-hole 387a having a diameter that is greater than the diameter of the third on-off valve 303 in the center portion. As the third on-off valve 303 is disposed on an inner side of the center through-hole 387a of the suppressing member 387, the movement of the third on-off valve 303 in the radial direction is suppressed. In addition, a plurality of periphery through-holes 387b are formed at an equivalent interval in the circumferential direction on the periphery of the center through-hole 387a in the suppressing member 387, and the oil circulates in the axial direction via the plurality of through-holes.

Configuration of Cover Member 395

The cover member 395 includes three cylindrical portions including a first cylindrical portion 396, a second cylindrical portion 397, and a third cylindrical portion 398 which have cylindrical shapes and have the same inner diameters and different outer diameters from each other.

The outer diameter of the first cylindrical portion 396 is smaller than the diameter of the inner circumferential surface of the first cylindrical portion 350 of the unit main body 330, and is greater than the inner diameter of the cylindrical portion 381 of the fourth on-off valve support member 380. As the upper end surface of the cylindrical portion 381 of the fourth on-off valve support member 380 abuts against the lower end surface of the first cylindrical portion 396, the upward movement of the fourth on-off valve support member 380 is suppressed. In addition, a groove 396a is formed on the outer circumferential surface of the first cylindrical portion 396. The groove 396a is recessed across the entire circumference of the outer circumferential surface of the first cylindrical portion 396. A seal member 399, such as an O-ring, which seals a gap between the groove 396a and the unit main body 330 is fitted to the groove 396a. In addition, the cover member 395 may be formed to be integrated with the unit main body 330.

The outer diameter of the second cylindrical portion 397 is substantially the same as the inner diameter of the cylindrical portion 381 of the fourth on-off valve support member 380. The second cylindrical portion 397 is fitted to the inner side of the cylindrical portion 381 of the fourth on-off valve support member 380.

The outer diameter of the third cylindrical portion 398 is smaller than the inner diameter of the cylindrical portion 381 of the fourth on-off valve support member 380. A seal member 314 which is an elastic member, such as a doughnut-shaped resin or rubber is pressurized to a space between the third cylindrical portion 398 and the cylindrical portion 381 of the fourth on-off valve support member 380. By reducing size of the third cylindrical portion 398 in the axial direction to be smaller than the size of the seal member 314, and by bringing the fourth on-off valve 304 into contact with the seal member 314, the flow path between the fourth on-off valve 304 and the seal member 314 is sealed.

The inner diameter of the cover member 395 is greater than the diameter of the third shaft portion 319 of the push rod 316, and the push rod 316 is disposed on the inner side of the cover member 395.

Configuration of Coil Spring Support Member 388

The coil spring support member 388 is a cross-shaped thin plate a center portion of which is formed with a through-hole having a diameter which is greater than the outer diameter of the columnar portion 383 of the fourth on-off valve support member 380. The thin plate has a cross shape when viewed in the axial direction. The coil spring support member 388 supports the upper end portion of the second coil spring 312 on the lower end surface.

The size in the radial direction from the center of the through-hole in the coil spring support member 388 is greater than a radius of the inner circumferential surface of the upper end side cylindrical portion 371 of the second on-off valve support member 370.

As the coil spring support member 388 abuts against the upper end surface of the upper end side cylindrical portion 371 of the second on-off valve support member 370, the downward movement thereof is suppressed.

The coil spring support member 388 is positioned at a position at which the downward biasing force applied from the leaf spring 389 and the upward biasing force applied from the second coil spring 312 are balanced.

Configuration of Support Member 400

As illustrated in FIG. 4, the support member 400 has a cylindrical portion 401 having a cylindrical shape, and an inward portion 402 that is formed to be radially oriented toward the inner side from a lower end portion of the cylindrical portion 401.

The outer circumferential surface of an upper end portion of the cylindrical portion 401 is formed with a male screw 403 that is tightened to a female screw formed on the cap 220. The male screw 403 formed on the outer circumferential surface of the cylindrical portion 401 is tightened to the female screw formed on the cap 220 such that the support member 400 is held by the cap 220. The flange portion of the fourth on-off valve support member 380 and the flange portion of the unit main body 330 are interposed between the inward portion 402 and the front wheel side solenoid 320 such that the support member 400 holds the fourth on-off valve support member 380 and the unit main body 330.

Regarding Positional Relationship Between Side Recess Portion 342b and First Radial Communication Hole 349a which are Formed in Upper End Side Columnar Portion 340 of Unit Main Body 330

Figure 7A:
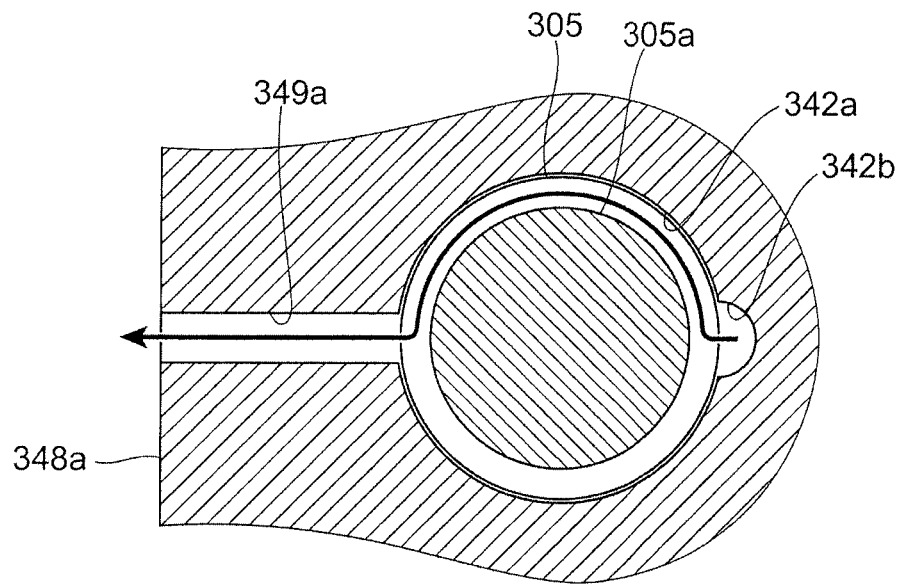
FIG. 7A is a view illustrating a state where a position of a groove of a control valve in an axial direction and a position of a first radial communication hole overlap each other.
Figure 7B:
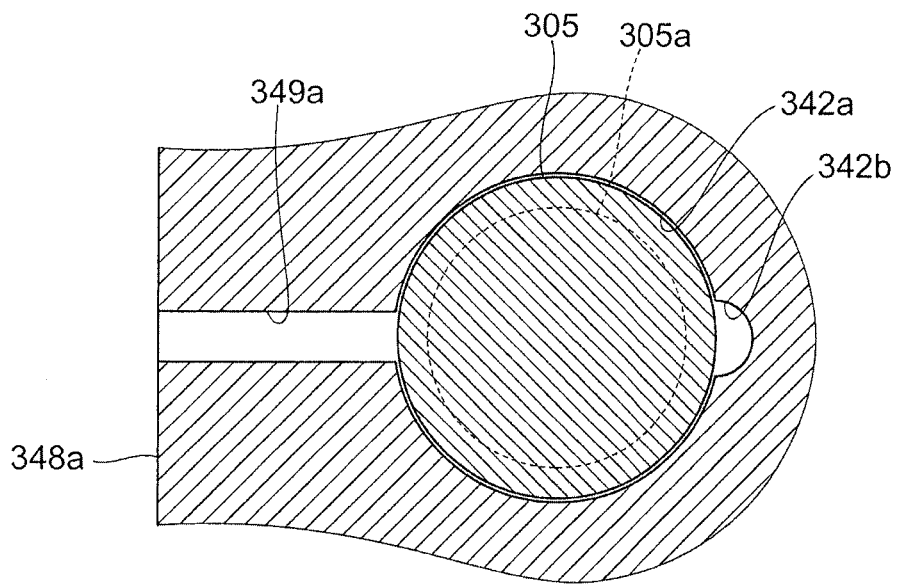
FIG. 7B is a view illustrating a state where the position of the groove of the control valve in the axial direction and the position of the first radial communication hole do not overlap each other.

FIGS. 7A and 7B are sectional views on a surface which is perpendicular in the axial direction and passes through the hole center of the first radial communication hole 349a of the upper end side columnar portion 340 of the unit main body 330. FIG. 7A is a view illustrating a state where a position of the groove 305a of the control valve 305 in the axial direction and a position of the first radial communication hole 349a overlap each other. FIG. 7B is a view illustrating a state where the position of the groove 305a of the control valve 305 in the axial direction and the position of the first radial communication hole 349a do not overlap each other.

In the front wheel side flow path switching unit 300 configured as described above, in a case where the energization to the coil 321 of the front wheel side solenoid 320 is stopped or a current which is less than a first reference current set in advance is supplied, the amount of protrusion of the operation rod 324 which protrudes from the case 325 becomes less than a first reference amount set in advance. In the embodiment, in a case where the amount of protrusion of the operation rod 324 is less than the first reference amount, the position in the axial direction of the groove 305a of the control valve 305 overlaps the first radial communication hole 349a formed in the upper end side columnar portion 340 of the unit main body 330. For example, in a case where the energization to the coil 321 of the front wheel side solenoid 320 is stopped and the amount of protrusion of the operation rod 324 is an initial amount, the control valve 305 is positioned at an initial position. In a case where the control valve 305 is at the initial position, the center position in the axial direction of the groove 305a of the control valve 305 and the position of the hole center of the first radial communication hole 349a become the same as each other, and the groove 305a and the first radial communication hole 349a overlap each other. In addition, at this time, as illustrated in FIG. 7A, the side recess portion 342b and the first radial communication hole 349a which are formed in the upper end side columnar portion 340 of the unit main body 330 communicate with each other via the groove 305a of the control valve 305 and the first on-off valve back pressure chamber B1 and the reservoir chamber 40 communicate with each other via the groove 305a of the control valve 305.

In a case where the current which is equal to or greater than the first reference current is supplied to the coil 321 of the front wheel side solenoid 320, the amount of protrusion of the operation rod 324 from the case 325 becomes equal to or greater than the first reference amount. In a case where the amount of protrusion of the operation rod 324 is equal to or greater than the first reference amount, the control valve 305 is pushed down by the operation rod 324 such that the position in the axial direction of the groove 305a of the control valve 305 becomes a position below the first radial communication hole 349a formed in the upper end side columnar portion 340 of the unit main body 330. In other words, in a case where the amount of protrusion from the case 325 is equal to or greater than the first reference amount, the operation rod 324 pushes down the control valve 305 until the position in the axial direction of the groove 305a of the control valve 305 is positioned below the first radial communication hole 349a formed in the upper end side columnar portion 340 of the unit main body 330. In a case where the groove 305a of the control valve 305 is positioned below the first radial communication hole 349a, the position in the axial direction of the groove 305a of the control valve 305 do not overlap the position of the first radial communication hole 349a. In addition, at this time, as illustrated in FIG. 7B, the side recess portion 342b and the first radial communication hole 349a which are formed in the upper end side columnar portion 340 of the unit main body 330 do not communicate with each other via the groove 305a of the control valve 305, and the first on-off valve back pressure chamber B1 and the reservoir chamber 40 do not communicate with each other via the groove 305a of the control valve 305.

In addition, an example in which the first reference amount of the amount of protrusion from the case 325 is half of a hole diameter of the first radial communication hole 349a formed in the upper end side columnar portion 340 of the unit main body 330 can be employed.

In a case where the current which is equal to or greater than a second reference current set in advance to be a value that is greater than the first reference current is supplied to the coil 321 of the front wheel side solenoid 320, the operation rod 324 moves further downward, and the amount of protrusion of the operation rod 324 from the case 325 becomes equal to or greater than a second reference amount set in advance to be a value that is greater than the first reference amount. In a case where the amount of protrusion of the operation rod 324 is equal to or greater than the second reference amount, the control valve 305 comes into contact with the push rod 316 and comes into contact with the third on-off valve 303, and the push rod 316 is placed in a state of being interposed between the control valve 305 and the third on-off valve 303.

In a case where the current which is equal to or greater than a third reference current set in advance to be a value that is greater than the second reference current is supplied to the coil 321 of the front wheel side solenoid 320, the amount of protrusion of the operation rod 324 from the case 325 becomes equal to or greater than a third reference amount set in advance to be a value that is greater than the second reference amount. When the amount of protrusion of the operation rod 324 from the case 325 becomes greater than the second reference amount, the push rod 316 is pushed downward via the control valve 305. The push rod 316 which has moved downward pushes down the third on-off valve 303, and the third on-off valve 303 is separated from the opening portion of the second through-hole 393b of the fourth on-off valve 304. In other words, the push rod 316 is pushed by the control valve 305 in a case where the amount of protrusion of the operation rod 324 from the case 325 is greater than the second reference amount, the third on-off valve 303 is pushed such that the third on-off valve 303 is separated from the opening portion of the second through-hole 393b of the fourth on-off valve 304. The third reference amount will be described later.

In a case where the current which is equal to or greater than a fourth reference current set in advance to be a value that is greater than the third reference current is supplied to the coil 321 of the front wheel side solenoid 320, the amount of protrusion of the operation rod 324 from the case 325 becomes equal to or greater than a fourth reference amount set in advance to be a value that is greater than the third reference amount. In a case where the amount of protrusion of the operation rod 324 is equal to or greater than the fourth reference amount, the third on-off valve 303 which is pushed down by the push rod 316 is mounted on the protrusion 382a of the inward portion 382 of the fourth on-off valve support member 380, and blocks the opening portion on the upper side of the axial through-hole 384. In other words, in a case where the amount of protrusion of the operation rod 324 from the case 325 is equal to or greater than the fourth reference amount, the push rod 316 pushes the third on-off valve 303 to block the opening portion on the upper side of the axial through-hole 384 formed in the fourth on-off valve support member 380.

Hereinafter, a state where the energization to the coil 321 is stopped or the current which is less than the first reference current is supplied, the position in the axial direction of the groove 305a of the control valve 305 overlaps the first radial communication hole 349a formed in the upper end side columnar portion 340 of the unit main body 330, and the first on-off valve back pressure chamber B1 and the reservoir chamber 40 communicate with each other via the groove 305a of the control valve 305, is referred to as a first switch state.

In addition, a state where the current which is equal to or greater than the first reference current and is equal to or lower than the second reference current is supplied to the coil 321, the operation rod 324 pushes down the control valve 305 to the position at which the groove 305a of the control valve 305 does not overlap the first radial communication hole 349a of the unit main body 330, the first on-off valve back pressure chamber B1 and the reservoir chamber 40 do not communicate with each other via the groove 305a of the control valve 305, and the third on-off valve 303 blocks the opening portion of the second through-hole 393b of the fourth on-off valve 304, is referred to as a second switch state.

In addition, a state where the current which is greater than the second reference current is supplied to the coil 321, the first on-off valve back pressure chamber B1 and the reservoir chamber 40 do not communicate with each other via the groove 305a of the control valve 305, and the third on-off valve 303 does not block both of the opening portion of the second through-hole 393b of the fourth on-off valve 304 and the opening portion of the axial through-hole 384 of the fourth on-off valve support member 380, is referred to as a third switch state.

In addition, a state where the current which is equal to or greater than the fourth reference current is supplied to the coil 321, the first on-off valve back pressure chamber B1 and the reservoir chamber 40 do not communicate with each other via the groove 305a of the control valve 305, the third on-off valve 303 blocks the opening portion of the axial through-hole 384 of the fourth on-off valve support member 380, is referred to as a fourth switch state. In the fourth switch state, as will be described later, the fourth on-off valve 304 is separated from the seal member 314.

Operation of Front Fork 21

In the front fork 21 configured as described above, the front wheel side spring 500 supports weight of the motorcycle 1 and absorbs shock, and the damping force generation unit 130 damps vibration of the front wheel side spring 500.

Figure 8:
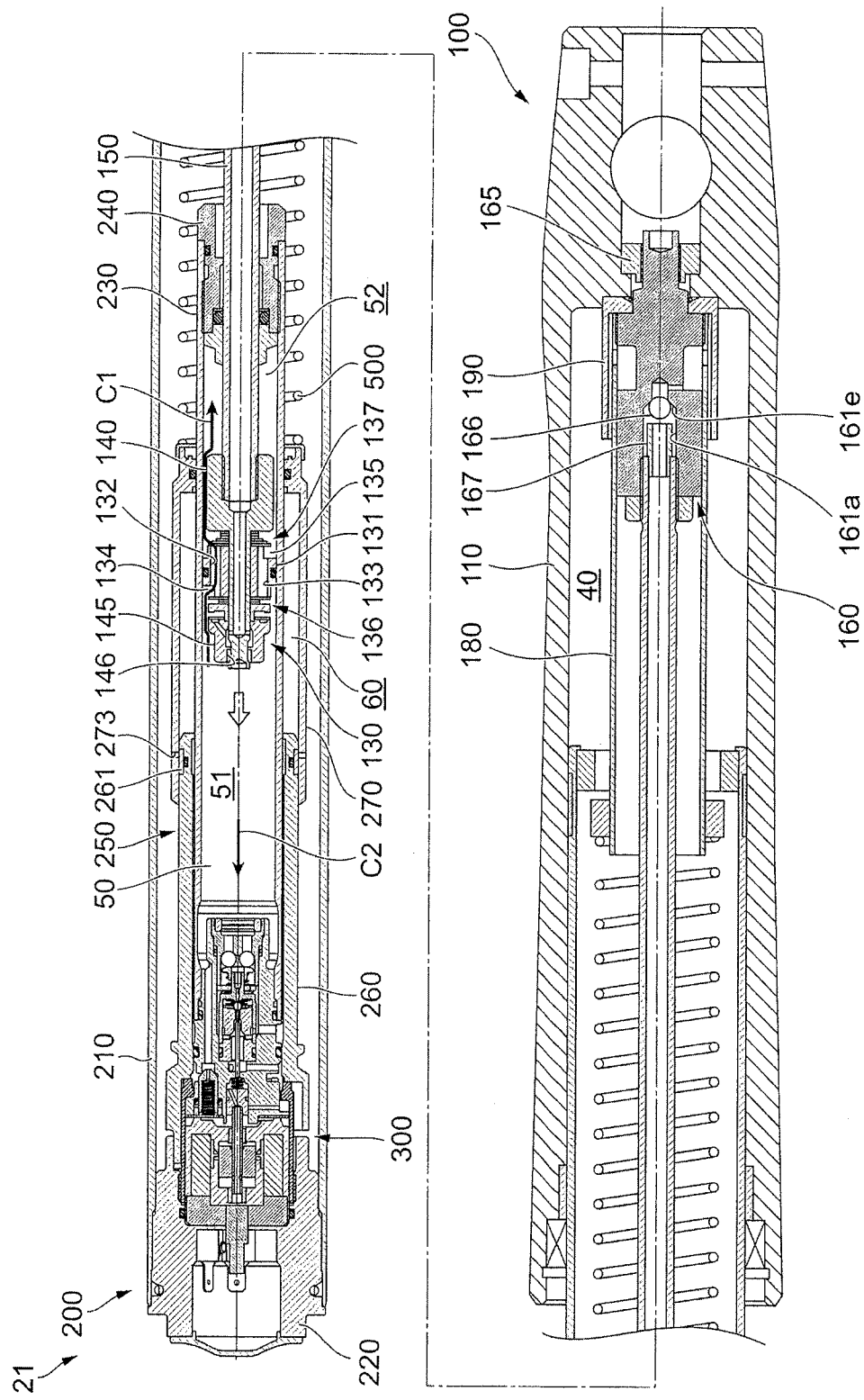
FIG. 8 is a view illustrating an operation of a front fork during a compression stroke.

FIG. 8 is a view illustrating the operation of the front fork 21 during a compression stroke.

When the front fork 21 undergoes the compression stroke, the piston 131 of the damping force generation unit 130 moves upward with respect to the cylinder 230 as illustrated by the white arrow, and due to the movement of the piston 131, oil in the first oil chamber 51 is pressed, and oil pressure increases. As a result, the first through-hole 132 is blocked, the lower end side valve 137 is opened, and the oil flows into the second oil chamber 52 via the first through-hole 132 (refer to arrow C1). The flow of the oil from the first oil chamber 51 to the second oil chamber 52 is restricted by the first through-hole 132 and the lower end side valve 137 such that a damping force is obtained during the compression stroke.

Since the rod 150 enters the cylinder 230 during the compression stroke, a volume of oil corresponding to the extent of the entry of the rod is supplied to the jack chamber 60 or the reservoir chamber 40 in accordance with a switch state of the front wheel side flow path switching unit 300 (refer to arrow C2). The supply of oil to either of the jack chamber 60 and the reservoir chamber 40 in accordance with a switch state of the front wheel side flow path switching unit 300 will be described later. The damping force generation unit 130, the rod 150, the cylinder 230, and the like work as a pump that supplies the oil in the cylinder 230 to the jack chamber 60 or the reservoir chamber 40. Hereinafter, this pump may be referred to as a "pump 600".

Figure 9:
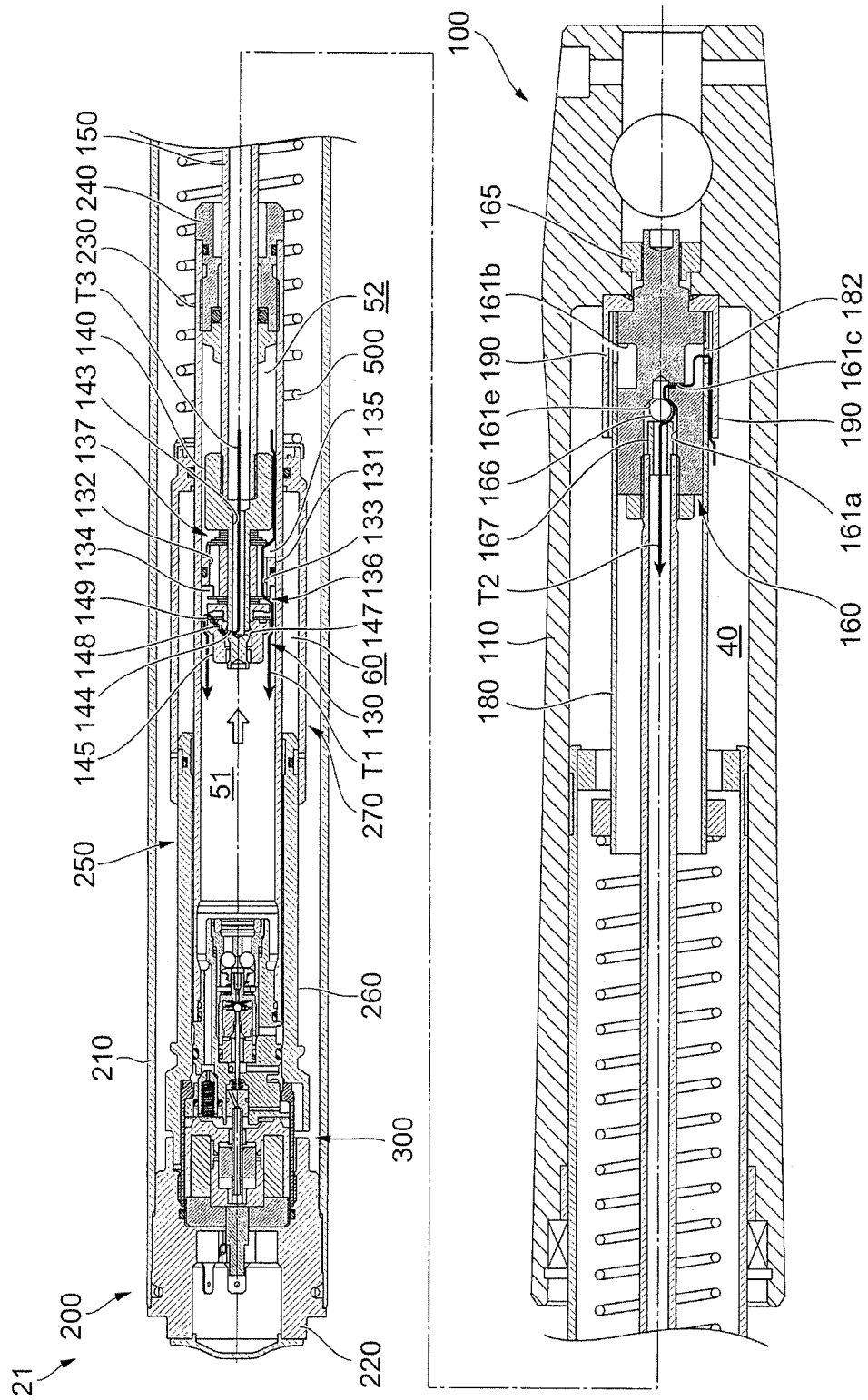
FIG. 9 is a view illustrating the operation of the front fork during an extension stroke.

FIG. 9 is a view illustrating the operation of the front fork 21 during an extension stroke.

When the front fork 21 undergoes the extension stroke, the piston 131 of the damping force generation unit 130 moves downward with respect to the cylinder 230 as illustrated by the white arrow, and due to the movement of the piston 131, oil in the second oil chamber 52 is pressed, and oil pressure increases. As a result, the second through-hole 133 is blocked, the upper end side valve 136 is opened, and the oil flows into the first oil chamber 51 via the second through-hole 133 (refer to arrow T1). The flow of the oil from the second oil chamber 52 to the first oil chamber 51 is restricted by the second through-hole 133 and the upper end side valve 136 such that a damping force is obtained during the extension stroke.

Since the rod 150 is pulled out of the cylinder 230 during the extension stroke, a volume of oil corresponding to the extent of the rod being pulled out is supplied from the reservoir chamber 40 to the first oil chamber 51. That is, oil in the reservoir chamber 40 enters the first oil chamber 51 the pressure of which has become low due to the downward movement of the piston 131. That is, the oil in the reservoir chamber 40 enters the axial recess portion 161a of the rod holding member 160 via the communication hole 182 of the support-member holding member 180, and the radial through-hole 161c of the rod holding member 160, moves the ball 166 upward, and then enters the inside of the rod 150 (refer to arrow T2). The oil, which has entered the inside of the rod 150, reaches the first oil chamber 51 via the recess portion 143 and the radial through-hole 144 of the piston bolt 140, and the inclination direction through-hole 148 of the nut 145 (refer to arrow T3). In addition, since the plate valve 149 which covers the opening portion of the inclination direction through-hole 148 is provided on the lower end side of the nut 145, it is prevented that the oil flows back to the inside of the rod 150 from the first oil chamber 51.

In this manner, the communication hole 182 of the support-member holding member 180, the radial through-hole 161c of the rod holding member 160, the axial recess portion 161a of the rod holding member 160, the inner portion of the rod 150, the recess portion 143 of the piston bolt 140, the radial through-hole 144, and the inclination direction through-hole 148 of the nut 145 function as a suction passage which suctions the oil to the inside of the cylinder 230 (first oil chamber 51) from the reservoir chamber 40. In addition, the ball 166 functions as a check valve that allows inflow of the oil to the inside of the rod 150 from the reservoir chamber 40 and suppresses discharge of the oil to the reservoir chamber 40 from the inside of the rod 150. Hereinafter, the ball 166 is referred to as a "suction side check valve Vc".

Flow State of Oil in Accordance with Switch State of Front Wheel Side Flow Path Switching Unit 300

Figure 10:
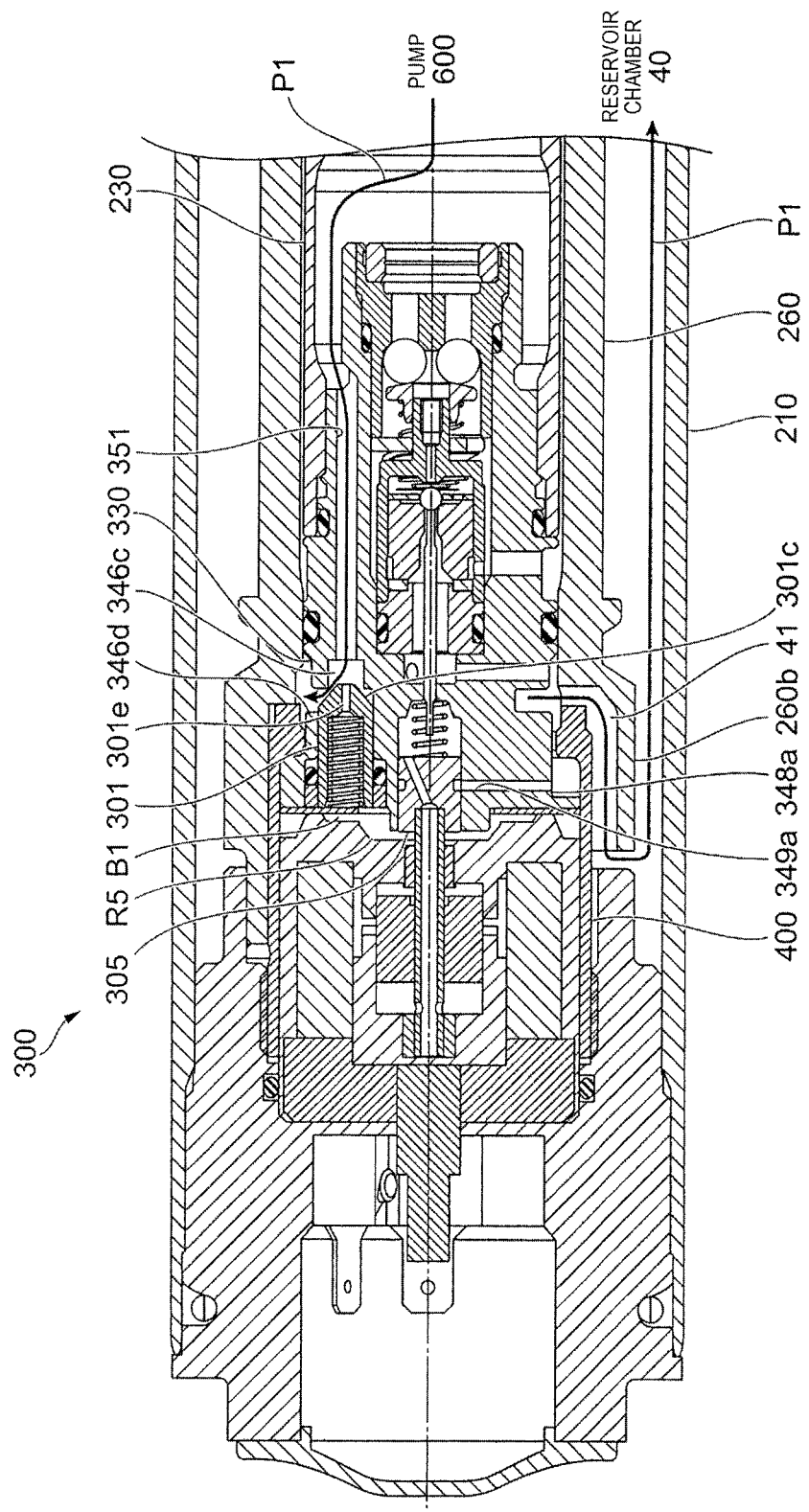
FIG. 10 is a view illustrating a flow state of oil in a case where the front wheel side flow path switching unit is in the first switch state.

FIG. 10 is a view illustrating a flow state of oil in a case where the front wheel side flow path switching unit 300 is in the first switch state.

In a case where the front wheel side flow path switching unit 300 is in the first switch state during the compression stroke of the front fork 21, as illustrated by arrow P1 in FIG. 10, oil discharged by the pump 600 which is configured with the damping force generation unit 130, the rod 150, the cylinder 230, and the like flows upward through an axial communication hole 351 formed in the unit main body 330. As illustrated in FIG. 7A, the oil of the first on-off valve back pressure chamber B1 is discharged to the outside of the unit main body 330 through the side recess portion 342b of the unit main body 330, the groove 305a of the control valve 305, and the first radial communication hole 349a of the unit main body 330. In addition, as illustrated by an arrow P1 in FIG. 10, the oil discharged to the outside of the unit main body 330 is oriented toward the reservoir chamber 40 through the gap between the cut-out portion 348a of the unit main body 330 and the support member 400, that is, through the flow path 41 formed between the protrusion portion 260b of the base member 260 and the lower end portion of the support member 400.

In addition, in a case where the front wheel side flow path switching unit 300 is in the first switch state, since the pressure in the first on-off valve back pressure chamber B1 is low, the oil which is discharged by the pump 600 and is oriented upward through the axial communication hole 351 formed in the unit main body 330 moves the first on-off valve 301 upward, and separates the inclined surface 301c of the first on-off valve 301 from the opening portion of the third columnar recess portion 346c of the unit main body 330. In addition, the oil which flows through the gap between the inclined surface 301c of the first on-off valve 301 and the unit main body 330 passes through the intersecting-direction communication hole 346d formed in the unit main body 330, and is oriented toward the reservoir chamber 40 through the flow path 41 formed between the protrusion portion 260b of the base member 260 and the lower end portion of the support member 400.

In other words, in a case where the front wheel side flow path switching unit 300 is in the first switch state, the pressure in the first on-off valve back pressure chamber B1 is not too high to make it difficult for the oil which is discharged by the pump 600 and is oriented upward through the axial communication hole 351 formed in the unit main body 330 to separate the first on-off valve 301 from the unit main body 330. As a result, the oil discharged by the pump 600 is oriented toward the reservoir chamber 40.

In this manner, the axial communication hole 351 of the unit main body 330, the intersecting-direction communication hole 346d, and the flow path 41 function as the first communication path R1 (refer to FIG. 3) which communicates with the inside of the cylinder 230 and the reservoir chamber 40.

In addition, the axial communication hole 351 of the unit main body 330, the through-hole 301e of the first on-off valve 301, the side recess portion 342b of the unit main body 330, the groove 305a of the control valve 305, the first radial communication hole 349a of the unit main body 330, and the flow path 41 function as a first communication path bypass path R5 which communicates with the inside of the cylinder 230 and the reservoir chamber 40. The control valve 305 functions as a valve which controls the opening and closing of the first on-off valve 301 by opening and closing the first communication path bypass path R5.

In addition, the side recess portion 342b, the accommodation portion 342a, and the first radial communication hole 349a which are formed in the unit main body 330 function as a discharge flow path through which the oil is oriented toward the reservoir chamber 40 from the first on-off valve back pressure chamber B1. The control valve 305 functions as a valve which controls the opening and closing of the first on-off valve 301 by opening and closing the discharge flow path.

Figure 11:
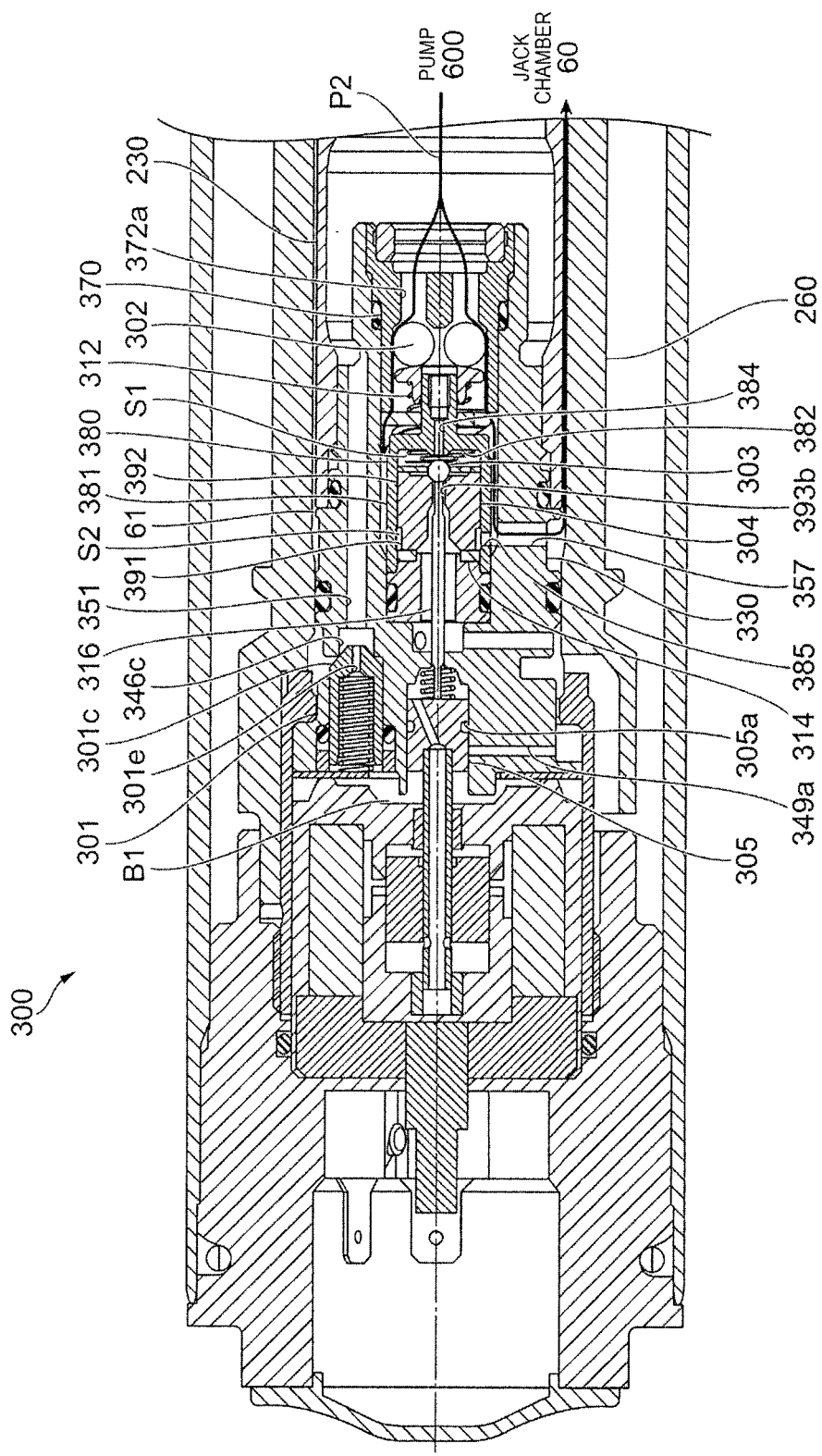
FIG. 11 is a view illustrating a flow state of oil in a case where the front wheel side flow path switching unit is in the second switch state.

FIG. 11 is a view illustrating a flow state of oil in a case where the front wheel side flow path switching unit 300 is in the second switch state.

In a case where the front wheel side flow path switching unit 300 is in the second switch state during the compression stroke of the front fork 21, since the first on-off valve back pressure chamber B1 and the reservoir chamber 40 do not communicate with each other via the groove 305a of the control valve 305, the oil in the first on-off valve back pressure chamber B1 is not oriented toward the reservoir chamber 40 through the groove 305a of the control valve 305. Meanwhile, the axial communication hole 351 formed in the unit main body 330 and the first on-off valve back pressure chamber B1 communicate with each other via the through-hole 301e of the first on-off valve 301.

Therefore, in a case where the front wheel side flow path switching unit 300 is in the second switch state, the pressure in the first on-off valve back pressure chamber B1 is not too high to make it difficult for the oil which is discharged by the pump 600 and is oriented upward through the axial communication hole 351 of the unit main body 330 to move the first on-off valve 301 upward (open the first on-off valve 301).

In this manner, in a case where the front wheel side flow path switching unit 300 is in the second switch state, since the first on-off valve 301 closes the first communication path R1, as illustrated by an arrow P2 illustrated in FIG. 11, the oil discharged by the pump 600 is oriented toward the jack chamber 60. In other words, the oil which is discharged by the pump 600 and passes through the axial through-hole 372a of the second on-off valve support member 370 pushes up the second on-off valve 302 against the biasing force of the second coil spring 312, and is oriented upward through the gap between the outer circumferential surface of the fourth on-off valve support member 380 and the inner circumferential surface of the unit main body 330. In addition, the oil which is oriented upward through the gap between the outer circumferential surface of the fourth on-off valve support member 380 and the inner circumferential surface of the unit main body 330 is oriented toward the outer side of the unit main body 330 through the third radial communication hole 357 of the unit main body 330. After this, the oil which passes through the third radial communication hole 357 is oriented toward the jack chamber 60 through the annular flow path 61 formed between the outer circumferential surface of the cylinder 230 and the inner circumferential surface of the base member 260 of the front wheel side spring-length changing unit 250.

In this manner, the axial through-hole 372a of the second on-off valve support member 370, the gap between the outer circumferential surface of the fourth on-off valve support member 380 and the inner circumferential surface of the unit main body 330, the third radial communication hole 357 of the unit main body 330, and the annular flow path 61 function as the second communication path R2 (refer to FIG. 3) which communicates with the inside of the cylinder 230 and the jack chamber 60. The second on-off valve 302 is also a check valve which allows the flow of the oil to the jack chamber 60 from the inside of the cylinder 230, and which interrupts the flow of the oil to the inside of the cylinder 230 from the jack chamber 60.

In addition, in a case where the front wheel side flow path switching unit 300 is in the second switch state, the third on-off valve 303 blocks the opening portion of the second through-hole 393b of the fourth on-off valve 304. Therefore, a space S1 surrounded by the inner circumferential surface of the cylindrical portion 381 of the fourth on-off valve support member 380, the lower end surface of the second columnar portion 392 of the fourth on-off valve 304, and the upper end surface of the inward portion 382 of the fourth on-off valve support member 380, and the jack chamber 60 communicate with each other via the axial through-hole 384 of the fourth on-off valve support member 380 or a spherical gap between on second on-off valve 302 and the other second on-off valve 302.

In addition, a space S2 which is between the inner circumferential surface of the cylindrical portion 381 of the fourth on-off valve support member 380 and the outer circumferential surface of the first columnar portion 391 of the fourth on-off valve 304, and the jack chamber 60 communicate with each other via the radial communication hole 385 of the fourth on-off valve support member 380.

As a result, the pressure of the oil in the space S1 which is oil that applies an upward force to the fourth on-off valve 304 is the same as the pressure of the oil in the space S2 which is oil that applies a downward force to the fourth on-off valve 304. In addition, in the fourth on-off valve 304, since a pressure-receiving area A1 (an area of the lower end surface of the second columnar portion 392) which receives the pressure of the oil in the space S1 is greater than a pressure-receiving area A2 (an area of the upper end surface of the second columnar portion 392) which receives the pressure of the oil in the space S2, the fourth on-off valve 304 is maintained to be in contact with the seal member 314.

Figure 12:
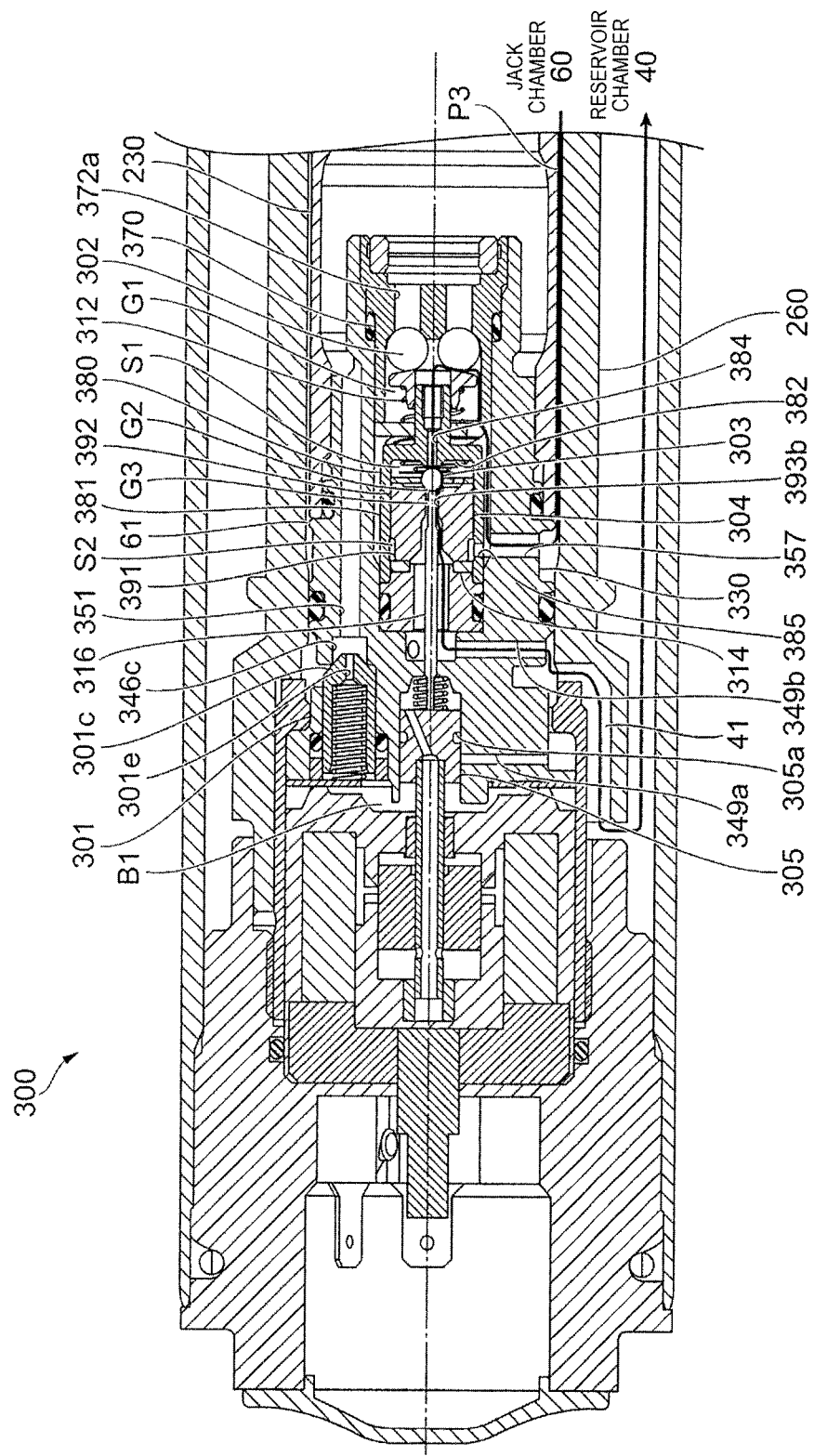
FIG. 12 is a view illustrating a flow state of oil in a case where the front wheel side flow path switching unit is in the third switch state.

FIG. 12 is a view illustrating a flow state of oil in a case where the front wheel side flow path switching unit 300 is in the third switch state.

In a case where the front wheel side flow path switching unit 300 is in the third switch state, as illustrated by an arrow P3 in FIG. 12, the oil in the jack chamber 60 is oriented toward the reservoir chamber 40. In other words, the oil in the jack chamber 60 is oriented downward through the annular flow path 61 formed between the outer circumferential surface of the cylinder 230 and the inner circumferential surface of the base member 260 of the front wheel side spring-length changing unit 250, the third radial communication hole 357 of the unit main body 330, and the gap between the outer circumferential surface of the fourth on-off valve support member 380 and the inner circumferential surface of the unit main body 330, and enters a gap G1 between the inner circumferential surface of the upper end side cylindrical portion 371 of the second on-off valve support member 370 and the outer circumferential surface of the columnar portion 383 of the fourth on-off valve support member 380. In addition, the oil in the gap G1 is oriented upward through the spherical gap between one second on-off valve 302 and the other second on-off valve 302, the axial through-hole 384 of the fourth on-off valve support member 380, the gap between the third on-off valve 303 and the fourth on-off valve 304, and the gap between the inner circumferential surface of the second through-hole 393b of the fourth on-off valve 304 and the outer circumferential surface of the push rod 316. The oil which is oriented upward is oriented toward the reservoir chamber 40 through the second radial communication hole 349b of the unit main body 330, and the flow path 41 formed between the protrusion portion 260b of the base member 260 and the lower end portion of the support member 400.

In this manner, the annular flow path 61, the third radial communication hole 357 of the unit main body 330, the gap between the outer circumferential surface of the fourth on-off valve support member 380 and the inner circumferential surface of the unit main body 330, the axial through-hole 384 of the fourth on-off valve support member 380, the gap between the third on-off valve 303 and the fourth on-off valve 304, the gap between the inner circumferential surface of the second through-hole 393b of the fourth on-off valve 304 and the outer circumferential surface of the push rod 316, the second radial communication hole 349b of the unit main body 330, and the flow path 41 function as the third communication path R3 (refer to FIG. 3) which communicates with the jack chamber 60 and the reservoir chamber 40. In addition, the third on-off valve 303 opens and closes the third communication path R3.

In addition, the annular flow path 61, the third radial communication hole 357 of the unit main body 330, the gap between the outer circumferential surface of the fourth on-off valve support member 380 and the inner circumferential surface of the unit main body 330, and the axial through-hole 384 of the fourth on-off valve support member 380 which are on the upstream side of the space S1 in the third communication path R3 function as an inflow path which is oriented toward the space S1 from the jack chamber 60. The third on-off valve 303 also opens and closes the inflow path.

In addition, in a case where the front wheel side flow path switching unit 300 is in the third switch state, the third on-off valve 303 is separated from the opening portion of the second through-hole 393b such that a gap G2 between the third on-off valve 303 and the opening portion of the second through-hole 393b of the fourth on-off valve 304 becomes the smallest restriction portion in the third communication path R3. In a state where the third on-off valve 303 is separated from the opening portion of the second through-hole 393b, the pressure of the oil in the space S1 which applies the upward force to the fourth on-off valve 304 is smaller than the pressure of the oil in the space S2 which is oil that applies the downward force to the fourth on-off valve 304, but the pressure-receiving area A1 is greater than the pressure-receiving area A2, and thus, the fourth on-off valve 304 is maintained to be in contact with the seal member 314 (pressure of oil in the space S1× pressure-receiving area A1>pressure of oil in the space S2× pressure-receiving area A2).

In other words, in a case where the front wheel side flow path switching unit 300 is in the third switch state, the fourth on-off valve 304 is set as follows to be maintained to be in contact with the seal member 314. In other words, the third reference amount is set so that the gap G2 becomes the smallest restriction portion by further reducing a flow path area formed by the gap G2 to be smaller than a flow path area (the smallest area of the inflow path) of the axial through-hole 384 of the fourth on-off valve support member 380 or an area (the smallest area of the flow path downstream of the gap G2) of the flow path formed by a gap G3 between the outer circumferential surface of the second shaft portion 318 of the push rod 316 and the inner circumferential surface of the second through-hole 393b of the fourth on-off valve 304. In addition, the third reference amount is set considering the pressure-receiving area A1 and the pressure-receiving area A2 so that a value obtained by multiplying the pressure of the oil in the space S1 that becomes small as the third on-off valve 303 is open by the pressure-receiving area A1 becomes greater than a value obtained by multiplying the pressure of the oil in the space S2 by the pressure-receiving area A2 (pressure of oil in the space S1× pressure-receiving area A1>pressure of oil in the space S2× pressure-receiving area A2).

Figure 13:
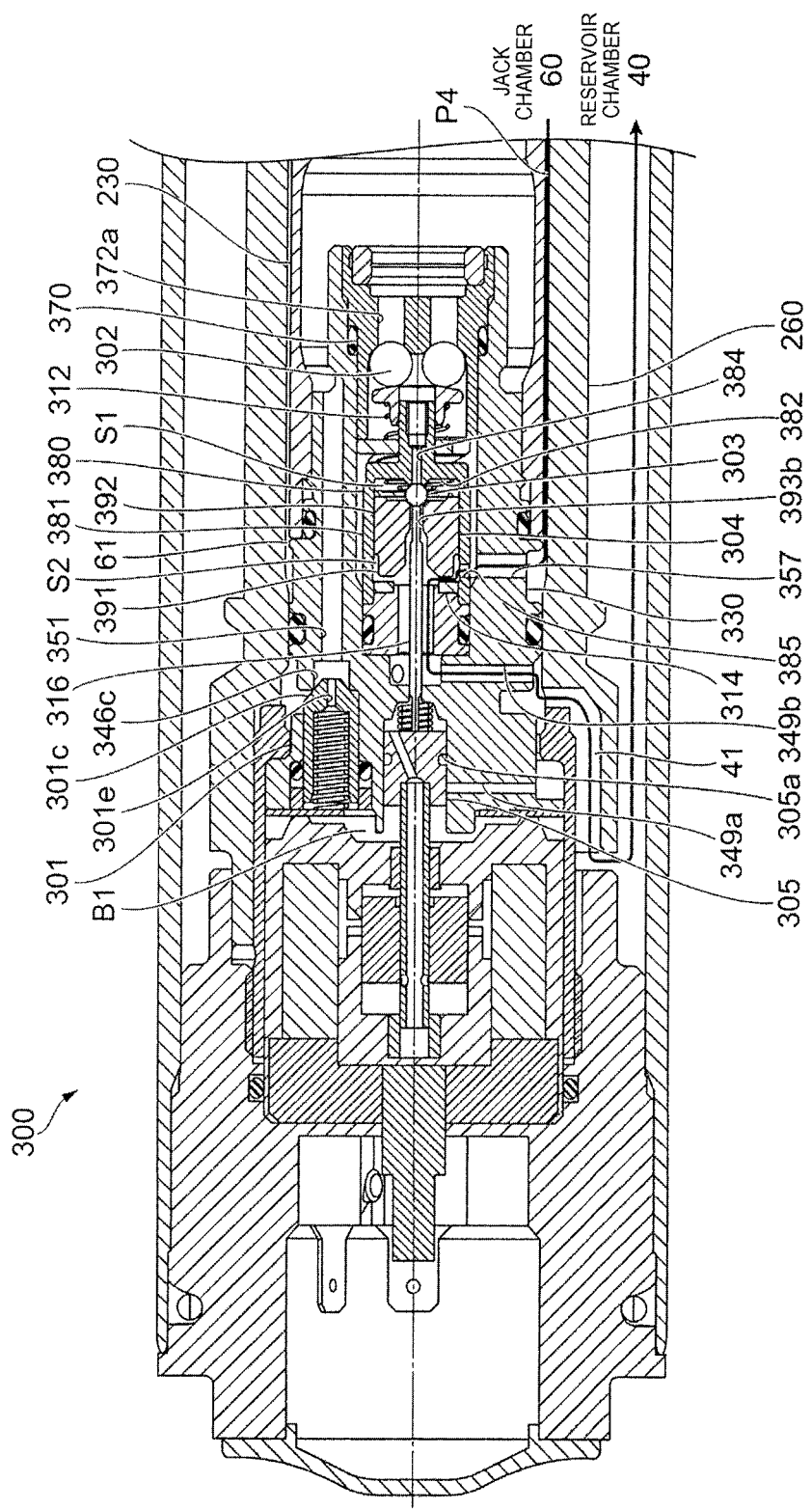
FIG. 13 is a view illustrating a flow state of oil in a case where the front wheel side flow path switching unit is in the fourth switch state.

FIG. 13 is a view illustrating a flow state of oil in a case where the front wheel side flow path switching unit 300 is in the fourth switch state.

In a case where the front wheel side flow path switching unit 300 is in the fourth switch state, since the third on-off valve 303 blocks the opening portion of the axial through-hole 384 of the fourth on-off valve support member 380, the inflow of the oil into the space S1 that applies the upward force to the fourth on-off valve 304 is small or the oil does not flow into the space S1. Therefore, even when the pressure of the oil in the space S1 is smaller than that of a case where the front wheel side flow path switching unit 300 is in the third switch state and the pressure-receiving area A1 is greater than the pressure-receiving area A2, the downward force applied to the fourth on-off valve 304 is greater than the upward force (pressure of oil in the space S1× pressure-receiving area A1<pressure of oil in the space S2× pressure-receiving area A2). As a result, the fourth on-off valve 304 is separated from the seal member 314. In addition, as illustrated by an arrow P4 in FIG. 13, the oil in the jack chamber 60 is oriented toward the reservoir chamber 40 through the gap between the fourth on-off valve 304 and the seal member 314. In other words, the oil in the jack chamber 60 is oriented toward the reservoir chamber 40 through the annular flow path 61, the third radial communication hole 357 of the unit main body 330, the radial communication hole 385 of the fourth on-off valve support member 380, the gap between the fourth on-off valve 304 and the seal member 314, the second radial communication hole 349b of the unit main body 330, the flow path 41 formed between the protrusion portion 260b of the base member 260 and the lower end portion of the support member 400.

In this manner, the annular flow path 61, the third radial communication hole 357 of the unit main body 330, the radial communication hole 385 of the fourth on-off valve support member 380, the gap between the fourth on-off valve 304 and the seal member 314, the second radial communication hole 349b of the unit main body 330, and the flow path 41 function as the fourth communication path R4 (refer to FIG. 3) which communicates with the jack chamber 60 and the reservoir chamber 40. In addition, the fourth on-off valve 304 opens and closes the fourth communication path R4.

Regarding Raising and Lowering Vehicle Height

In a case where the front wheel side flow path switching unit 300 is in the second switch state, during the compression stroke of the front fork 21 that operates as described above, the oil discharged by the pump 600 flows into the jack chamber 60, and the amount of oil in the jack chamber 60 increases. Due to an increase in amount of oil in the jack chamber 60, the upper end portion support member 270 moves downward with respect to the base member 260 of the front wheel side spring-length changing unit 250. When the spring length of the front wheel side spring 500 decreases due to the downward movement of the upper end portion support member 270 with respect to the base member 260, a spring force of the front wheel side spring 500 pushing the upper end portion support member 270 increases compared to that before the upper end portion support member 270 moves with respect to the base member 260. As a result, even when a force acts on the front wheel 2 side from the vehicle body frame 11, an initial set load (preload) at which relative positions both of the front wheel 2 and the vehicle body frame 11 are not changed, increases. In this case, in a case where the same force acts on the front wheel 2 from the vehicle body frame 11 (a seat 19) side in the axial direction, the amount of compression of the front fork 21 decreases. Therefore, when the spring length of the front wheel side spring 500 decreases due to the movement of the upper end portion support member 270 with respect to the base member 260, the height of the seat 19 is raised (the vehicle height is raised) as compared to that before the upper end portion support member 270 moves with respect to the base member 260.

On the other hand, in a case where the front wheel side flow path switching unit 300 is in the third switch state or in the fourth switch state, the amount of oil in the jack chamber 60 decreases. Thereby, the upper end portion support member 270 moves upward with respect to the base member 260 of the front wheel side spring-length changing unit 250. When the spring length of the front wheel side spring 500 increases due to the upward movement of the upper end portion support member 270 with respect to the base member 260, a spring force of the front wheel side spring 500 pushing the upper end portion support member 270 decreases as compared to that before the upper end portion support member 270 moves with respect to the base member 260. In this case, the initial set load (preload) decreases, and in a case where the same force acts from the vehicle body frame 11 (the seat 19) in the axial direction, the amount of compression of the front fork 21 increases. Therefore, when the spring length of the front wheel side spring 500 increases due to the upward movement of the upper end portion support member 270 with respect to the base member 260, the height of the seat 19 is lowered (the vehicle height is lowered) as compared to that before the upper end portion support member 270 moves with respect to the base member 260. When the front wheel side flow path switching unit 300 is in the fourth switch state, the amount of oil in the jack chamber 60 decreases more quickly than that in a case of the third switch state, and thus, the vehicle height is lowered more quickly than in the third switch state.

In a case where the front wheel side flow path switching unit 300 is in the first switch state, the oil discharged by the pump 600 during the compression stroke flows into the reservoir chamber 40, and thus, the amount of oil in the jack chamber 60 neither increases nor decreases. Hence, the height of the seat 19 is maintained (the vehicle height is maintained).

In this manner, the front wheel side flow path switching unit 300 according to the embodiment can open any communication path among the first communication path R1, the second communication path R2, and the third communication path R3, in accordance with the amount of supplied current. In other words, the front wheel side flow path switching unit 300 can raise the vehicle height, lower the vehicle height, or maintain the vehicle height by suppressing the axial movement amount of the operation rod 324 of the front wheel side solenoid 320, in accordance with the amount of supplied current. In other words, the front wheel side flow path switching unit 300 configured as a single unit can control three control modes in accordance with the amount of current: a raising mode in which the vehicle height is raised; a lowering mode in which the vehicle height is lowered; and a maintaining mode in which the vehicle height is maintained. In addition, in the lowering mode, the front wheel side flow path switching unit 300 can realize a slow lowering mode in which the vehicle height can be slowly lowered; and a quick lowering mode in which the vehicle height is quickly lowered.

In addition, the front wheel side flow path switching unit 300 which realizes the above-described function is configured to be attached to the upper end portion of the cylinder 230 on the inner side of the inner tube 210. In other words, the front wheel side flow path switching unit 300 is not disposed on the outer side of the inner tube 210. In addition, the front wheel side flow path switching unit 300 does not require a plurality of electromagnetic actuators (solenoids or the like) so as to realize the three control modes. Hence, according to the front wheel side flow path switching unit 300 according to the embodiment, it is possible to reduce a mounting space by simplifying the configuration of the front fork 21, and to realize the aforementioned function. In other words, the front fork 21 can switch between the three control modes without an increase in size by employing the front wheel side flow path switching unit 300 according to the embodiment to the front fork 21 which has a limited surrounding space.

The front wheel side flow path switching unit 300 according to the embodiment is placed in the maintaining mode in a case where the current to be supplied is less than the first reference current, the raising mode in a case where the current to be supplied is equal to or greater than the first reference current and is less than the second reference current, and the lowering mode in a case where the current to be supplied is equal to or greater than the second reference current. In other words, the front wheel side flow path switching unit 300 sequentially transitions from the maintaining mode, to the raising mode, and to the lowering mode in accordance with the increase in amount of current to be supplied.

In this manner, the front wheel side flow path switching unit 300 according to the embodiment does not sequentially transition from the maintaining mode, to the lowering mode, and to the raising mode in accordance with the increase in amount of current to be supplied. In a case where the front wheel side flow path switching unit 300 is configured to transition from the maintaining mode, to the lowering mode, and to the raising mode, when the amount of current is decreased so as to maintain a raised vehicle height, there is a concern that the amount of current is adjusted to the amount of current corresponding to the lower mode, and the vehicle height is lowered.

Meanwhile, since the front wheel side flow path switching unit 300 according to the embodiment sequentially transitions from the maintaining mode, to the raising mode, and to the lowering mode in accordance with the increase in the amount of current to be supplied, even when the amount of current is decreased so as to maintain a raised vehicle height, the vehicle height is not lowered.

The front wheel side flow path switching unit 300 which is an example of a flow path control device according to the embodiment as described above includes the first on-off valve 301 which is an example of a first valve, and the unit main body 330 which is an example of a flow path forming member. The first on-off valve 301 opens and closes the first communication path R1 which is an example of a first flow path. In the first communication path R1, the supplied oil is oriented toward the reservoir chamber 40 which is an example of a first chamber. The unit main body 330 forms a discharge flow path which is an example of a second flow path that is oriented toward the reservoir chamber 40 from the first on-off valve back pressure chamber B1 which is an example of a second chamber that accommodates the oil which applies the force in the direction in which the first on-off valve 301 is closed to the first on-off valve 301. The unit main body 330 is formed with the accommodation portion 342a, the first radial communication hole 349a, and the side recess portion 342b. The accommodation portion 342a is an example of a first recess portion and is recessed from the first on-off valve back pressure chamber B1. The first radial communication hole 349a is an example of a communication path and communicates with the accommodation portion 342a and the reservoir chamber 40. The side recess portion 342b is an example of a second recess portion and is recessed from the first on-off valve back pressure chamber B1 so as to be continuous to the accommodation portion 342a and not to be continuous to the first radial communication hole 349a. The unit main body 330 forms the discharge flow path which is an example of a second flow path that is oriented toward the reservoir chamber 40 from the first on-off valve back pressure chamber B1 via the first radial communication hole 349a and the side recess portion 342b. Then, the front wheel side flow path switching unit 300 includes the control valve 305 which is an example of a second valve. The control valve 305 is formed with the groove 305a which is recessed from the outer surface. The control valve 305 is fitted to the accommodation portion 342a of the unit main body 330. The control valve 305 opens and closes the discharge flow path which is an example of a second flow path by moving between (i) the position at which the groove 305a communicates with the side recess portion 342b and the first radial communication hole 349a and (ii) the position at which the groove 305a does not communicate with the side recess portion 342b and the first radial communication hole 349a.

According to the front wheel side flow path switching unit 300 configured as described above, in a case where the control valve 305 is at the position at which the groove 305a communicates with the side recess portion 342b and the first radial communication hole 349a, the pressure in the first on-off valve back pressure chamber B1 decreases since the oil in the first on-off valve back pressure chamber B1 is oriented toward the reservoir chamber 40. As a result, the force in the direction in which the first on-off valve 301 is closed decreases, the first on-off valve 301 is open, and the oil supplied from the pump 600 is oriented toward the reservoir chamber 40.

Meanwhile, in a case where the control valve 305 is positioned at a position at which the groove 305a does not communicate with the side recess portion 342b and the first radial communication hole 349a, the pressure in the first on-off valve back pressure chamber B1 is high since the oil in the first on-off valve back pressure chamber B1 is unlikely to be oriented toward the reservoir chamber 40. As a result, the force in the direction in which the first on-off valve 301 is closed increases, the first on-off valve 301 is closed, and the oil supplied from the pump 600 is unlikely to be oriented toward the reservoir chamber 40. According to the front wheel side flow path switching unit 300 according to the embodiment, since it is possible to control the opening and closing of the first on-off valve 301 by suppressing the position of the control valve 305, it is possible to control whether or not the oil supplied from the pump 600 is oriented toward the reservoir chamber 40 with high accuracy. Therefore, for example, even when a large amount of oil is discharged by the pump due to rapid vibration of the front wheel 2 by reducing the interval of roughness of a road surface or a large amplitude of vibration of the front wheel 2 by increasing roughness of a road surface, it is possible to control whether or not the oil supplied from the pump 600 is oriented toward the reservoir chamber 40 with high accuracy, and thus, it is possible to control the amount of oil in the jack chamber 60 with high accuracy.

Here, the side recess portion 342b of the unit main body 330 may be recessed in the same direction as the moving direction of the control valve 305, and the first radial communication hole 349a may be formed in the direction intersecting with the moving direction of the control valve 305. Accordingly, it is possible to easily control whether or not the side recess portion 342b and the first radial communication hole 349a communicate with each other by moving the control valve 305 with high accuracy.

In addition, in the moving direction of the control valve 305, the side recess portion 342b and the first radial communication hole 349a may communicate with each other in a case where the groove 305a of the control valve 305 overlap the first radial communication hole 349a of the unit main body 330, and the side recess portion 342b and the first radial communication hole 349a may not communicate with each other in a case where the groove 305a does not overlap the first radial communication hole 349a. Accordingly, it is possible to easily control the opening and closing of the first on-off valve 301 according to whether or not the position of the groove 305a of the control valve 305 matches the position of the first radial communication hole 349a of the unit main body 330.

Figure 14:
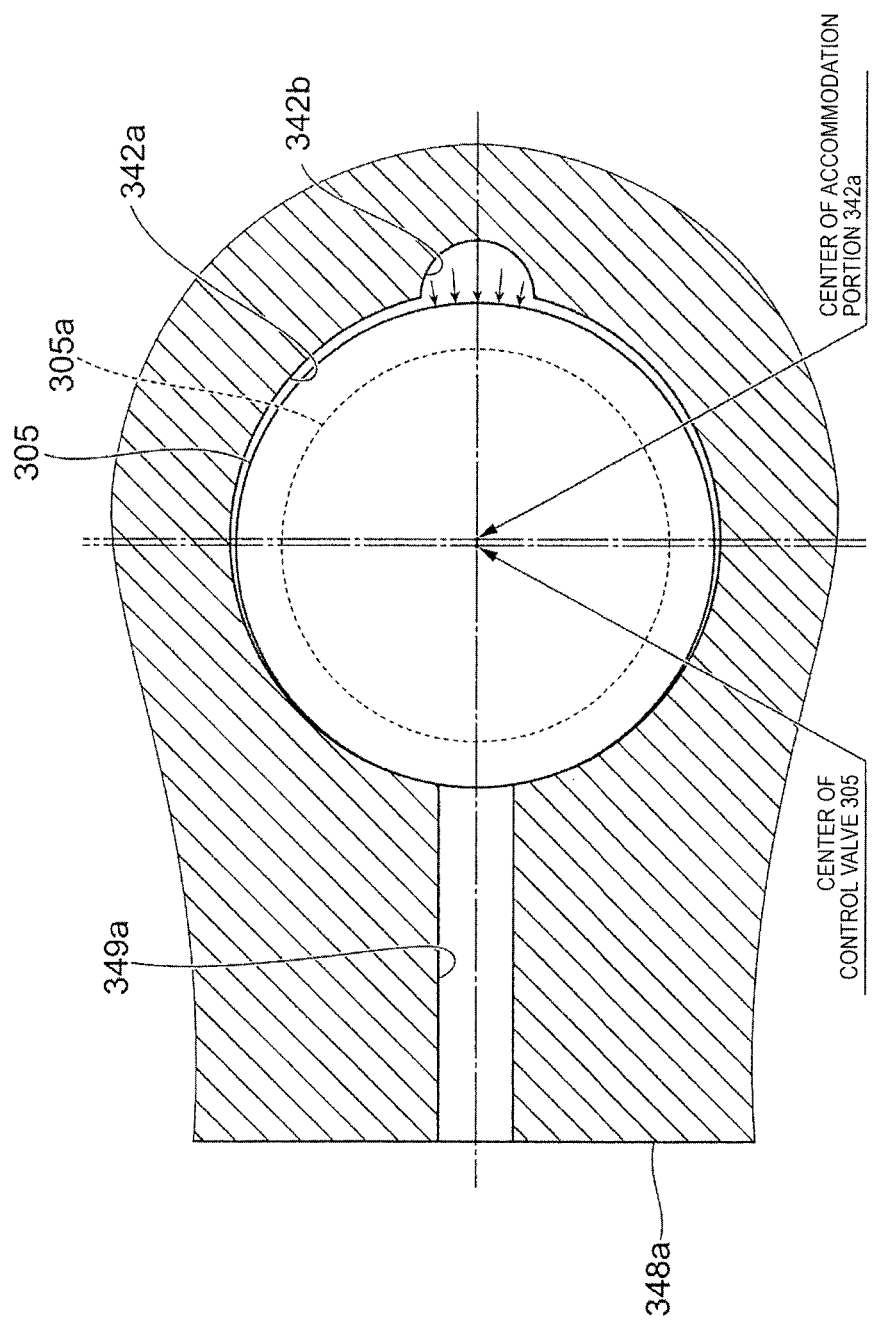
FIG. 14 is a view illustrating a positional relationship between an outer circumferential surface of the control valve and an opening portion of a first radial communication hole in a case where the groove is at a position which does not communicate with a side recess portion and the first radial communication hole.

FIG. 14 is a view illustrating a positional relationship between the outer circumferential surface of the control valve 305 and the opening portion of a first radial communication hole 349a in a case where the groove 305a is at a position which does not communicate with the side recess portion 342b and the first radial communication hole 349a.

The control valve 305 may have a columnar shape and move in an axial direction of the columnar shape. When viewed in the moving direction of the control valve 305, the first radial communication hole 349a of the unit main body 330 may be formed on the side opposite to the side recess portion 342b across the center of the control valve 305. Accordingly, the force which is oriented toward the first radial communication hole 349a is applied to the control valve 305 by the oil in the side recess portion 342b. As a result, in particular, in a case where the position of the control valve 305 in the moving direction is the position at which the groove 305a does not overlap the first radial communication hole 349a, as illustrated in FIG. 14, the outer surface of the control valve 305 blocks the opening portion of the first radial communication hole 349a. Therefore, for example, even in a case of a dimensional relationship in which the inner surface of the accommodation portion 342a is greater than the outer surface of the control valve 305 and a gap is generated between the outer surface of the control valve 305 and the inner surface of the accommodation portion 342a, it is possible to maintain high pressure in the first on-off valve back pressure chamber B1 since the oil in the first on-off valve back pressure chamber B1 is unlikely to be oriented toward the reservoir chamber 40.

In addition, when the force oriented toward first radial communication hole 349a is applied to the control valve 305 by the oil in the side recess portion 342b, the first radial communication hole 349a and the side recess portion 342b may not be formed to be opposite to each other across the center of the control valve 305. In addition, the control valve 305 may have a shape of a square column.

As described above, the front wheel side flow path switching unit 300 which is an example of a flow path control device according to the embodiment includes the fourth on-off valve 304 which is an example of a first valve. The fourth on-off valve 304 transitions from a closed state in which the fourth communication path R4 which is an example of a first flow path and which is oriented from the jack chamber 60 which is an example of a first chamber toward the reservoir chamber 40 which is an example of a second chamber is closed to an open state in which the fourth communication path R4 is open by moving from the closed state to the space S1 which is an example of a third chamber. The fourth on-off valve 304 is formed with the axial through-hole 393 which is an example of a communication path and which communicates with the fourth communication path R4 and the space S1. The pressure-receiving area A1 which is an example of a first pressure-receiving area and to which the pressure in the jack chamber 60 is applied in the closed state is smaller than the pressure-receiving area A2 which is an example of a second pressure-receiving area and to which the pressure in the space S1 is applied. In addition, the front wheel side flow path switching unit 300 includes the third on-off valve 303 which is an example of a second valve. The third on-off valve 303 is provided in the space S1 on the third communication path R3 which is an example of the second flow path. The third communication path R3 is oriented from the jack chamber 60 toward the reservoir chamber 40 through the axial through-hole 393 of the fourth on-off valve 304. The third on-off valve 303 transitions between (i) a first state where the axial through-hole 393 is closed and the inflow path oriented from the jack chamber 60 toward the space S1 is open and (ii) a second state where the inflow path is closed and the axial through-hole 393 is open.

According to the front wheel side flow path switching unit 300 configured as described above, in a case of the first state where the third on-off valve 303 closes the axial through-hole 393 of the fourth on-off valve 304 and opens the inflow path that reaches the space S1 from the jack chamber 60, the jack chamber 60 and the space S1 which is a back pressure chamber of the fourth on-off valve 304 have the same pressure. Then, since the pressure-receiving area A1 of the fourth on-off valve 304 to which the pressure of the jack chamber 60 is applied in the closed state is smaller than the pressure-receiving area A2 to which the pressure in the space S1 is applied, the fourth on-off valve 304 is placed in the closed state. Since the third on-off valve 303 closes the axial through-hole 393 of the fourth on-off valve 304, the third communication path R3 is also closed. Therefore, the oil in the jack chamber 60 does not reach the reservoir chamber 40.

On the other hand, in a case of the second state where the third on-off valve 303 closes the inflow path that reaches the space S1 from the jack chamber 60 and opens the axial through-hole 393 of the fourth on-off valve 304, the oil is not supplied to the space S1 which is the back pressure chamber of the fourth on-off valve 304. Thus, the pressure becomes lower than that of the jack chamber 60. Therefore, the fourth on-off valve 304 is likely to move to the space S1, and the fourth on-off valve 304 is likely to be open. Then, in the front wheel side flow path switching unit 300 according to the embodiment, in a case where the third on-off valve 303 is in the second state, the fourth on-off valve 304 is set to be in the open state. As a result, the oil in the jack chamber 60 is likely to reach the reservoir chamber 40 through the fourth communication path R4.

With the front wheel side flow path switching unit 300 according to the embodiment, it is possible to control the opening and closing of the fourth on-off valve 304 by controlling the opening and closing of the third on-off valve 303. Thus, it is possible to control whether or not the oil in the jack chamber 60 is oriented toward the reservoir chamber 40 with high accuracy.

Here, the third on-off valve 303 may transition to the third state where the axial through-hole 393 and the inflow path are open such that the gap G2 between the third on-off valve 303 and the opening portion of the axial through-hole 393 of the fourth on-off valve 304 becomes the smallest restriction portion of the third communication path R3. In a case where the third on-off valve 303 is in the third state, the axial through-hole 393 of the fourth on-off valve 304 and the inflow path are open. Thus, the third communication path R3 is open, and the oil in the jack chamber 60 reaches the reservoir chamber 40 through the third communication path R3. In addition, the pressure in the space S1 which is the back pressure chamber of the fourth on-off valve 304 becomes lower than that of the jack chamber 60. However, since the gap G2 between the third on-off valve 303 and the opening portion of the axial through-hole 393 of the fourth on-off valve 304 is the smallest restriction portion of the third communication path R3, the pressure in the space S1 is higher than that of the axial through-hole 393 of the fourth on-off valve 304. Therefore, the position of the fourth on-off valve 304 is determined by the size of the pressure-receiving area A1 of the fourth on-off valve 304 to which the pressure of the jack chamber 60 is applied in the closed state and the size of the pressure-receiving area A2 to which the pressure in the space S1 is applied.

Then, in a case where the third on-off valve 303 is in the third state, the pressure-receiving area A2 of the fourth on-off valve 304 may be greater than the pressure-receiving area A1 such that the fourth on-off valve 304 is closed. Accordingly, in a case where the third on-off valve 303 is in the third state, while the fourth on-off valve 304 is in the closed state, the oil in the jack chamber 60 can reach the reservoir chamber 40 only through the third communication path R3. Then, by reducing the flow path area of the third communication path R3 to be smaller than the flow path area of the fourth communication path R4, it is possible to reduce the speed by which the oil in the jack chamber 60 reaches the reservoir chamber 40 in a case where the third on-off valve 303 is in the third state as compared with a case where the third on-off valve 303 is in the second state. In addition, as the fourth on-off valve 304 is in the closed state in a case where the third on-off valve 303 is in the third state, it is possible to more rapidly change from a state where the amount of oil in the jack chamber 60 is reduced and the vehicle height is low to a state where the amount of oil in the jack chamber 60 is maintained and the vehicle height is maintained, in a case where the third on-off valve 303 is in the third state as compared with a case where the fourth on-off valve 304 is in an open state.

The front fork 21 which is an example of a vehicle height adjustment apparatus according to embodiment as described above includes the spring 500, the spring-length changing unit 250 which is an example of a changing device, the first on-off valve 301 which is an example of a first valve, the control valve 305 which is an example of a back pressure adjustment valve, and the second on-off valve 302. One end of the spring 500 is supported on the vehicle body side. The other end of the spring 500 is supported on the wheel side. The spring-length changing unit 250 changes the length of the spring 500 in accordance with the amount of oil in the jack chamber 60 which is an example of the accommodation chamber that accommodates the oil. The first on-off valve 301 opens and closes the first communication path R1 which is an example of a first flow path. In the first flow path, the oil supplied from the pump 600 is oriented toward the reservoir chamber 40 which is an example of a storage chamber. The control valve 305 opens and closes the discharge flow path oriented toward the reservoir chamber 40 from the first on-off valve back pressure chamber B1 which is an example of a back pressure chamber. The first on-off valve back pressure chamber B1 accommodates oil that applies the force in the direction in which the first on-off valve 301 is closed to the first on-off valve 301. The second on-off valve 302 opens and closes the second communication path R2 which is an example of a second flow path. In the second flow path, the oil supplied from the pump 600 is oriented toward the jack chamber 60 in a case where the first on-off valve 301 is in the closed state.

With the front fork 21 according to the embodiment configured as described above, in a case where the control valve 305 opens the discharge flow path oriented toward the reservoir chamber 40 from the first on-off valve back pressure chamber B1, the pressure in the first on-off valve back pressure chamber B1 is low since the oil in the first on-off valve back pressure chamber B1 is oriented toward the reservoir chamber 40. As a result, the force in the direction in which the first on-off valve 301 is closed decreases, the first on-off valve 301 is open, and the oil supplied from the pump 600 is oriented toward the reservoir chamber 40. Meanwhile, in a case where the control valve 305 closes the discharge flow path oriented toward the reservoir chamber 40 from the first on-off valve back pressure chamber B1, the pressure in the first on-off valve back pressure chamber B1 is high since the oil in the first on-off valve back pressure chamber B1 is unlikely to be oriented toward the reservoir chamber 40. As a result, the force in the direction in which the first on-off valve 301 is closed increases, the first on-off valve 301 is unlikely to be open, and the oil supplied from the pump 600 is unlikely to be oriented toward the reservoir chamber 40. Then, in the front fork 21 according to the embodiment, in a case where the first on-off valve 301 is closed, the second on-off valve 302 opens the second communication path R2. Thus, the oil supplied from the pump 600 is oriented toward the jack chamber 60 through the second communication path R2. With the front fork 21 according to the embodiment, it is possible to control the opening and closing of the first on-off valve 301 by controlling the position of the control valve 305. Thus, it is possible to control whether the oil supplied from the pump 600 is oriented toward the reservoir chamber 40 or is oriented toward the jack chamber 60, with high accuracy. Therefore, it is possible to control the length of the spring 500 with high accuracy by controlling the position of the control valve 305, and to adjust the vehicle height with high accuracy.

Then, the front fork 21 may further include the unit main body 330 which is an example of a flow path forming member. The unit main body 330 forms the discharge flow path oriented toward the reservoir chamber 40 from the first on-off valve back pressure chamber B1 via the upper end side center recess portion 342 which is an example of a recess portion that is recessed from the first on-off valve back pressure chamber B1. The control valve 305 may be fitted to the upper end side center recess portion 342 of the unit main body 330 to be movable between a position at which the discharge flow path is open and a position at which the discharge flow path is closed. Accordingly, it is possible to control the pressure in the first on-off valve back pressure chamber B1 with high accuracy by controlling the position of the control valve 305, and to control the opening and closing of the first on-off valve 301 with high accuracy. As a result, it is possible to adjust the vehicle height with high accuracy.

In addition, the front fork 21 may further include the third on-off valve 303 which is an example of a third valve. The third on-off valve 303 opens and closes the third communication path R3 which is an example of a third flow path oriented toward the reservoir chamber 40 from the jack chamber 60 by moving in accordance with the position of the control valve 305. Accordingly, it is possible to control the position of the third on-off valve 303 by controlling the position of the control valve 305, and to control the opening and closing of the third communication path R3 oriented toward the reservoir chamber 40 from the jack chamber 60 with high accuracy. Therefore, it is possible to control whether the amount of oil in the jack chamber 60 is reduced by allowing the oil in the jack chamber 60 to be oriented toward the reservoir chamber 40, or the amount of oil in the jack chamber 60 is maintained with high accuracy, and to adjust the vehicle height with high accuracy.

In addition, the front fork 21 may further include the fourth on-off valve 304 which is an example of a fourth valve. The fourth on-off valve 304 opens and closes the fourth communication path R4 which is an example of a fourth flow path, by moving in accordance with the position of the third on-off valve 303. The fourth communication path R4 is a flow path oriented toward the reservoir chamber 40 from the jack chamber 60. The flow path area of the fourth communication path R4 is greater than that of the third communication path R3. Accordingly, it is possible to control the position of the fourth on-off valve 304 by controlling the position of the control valve 305 that controls the position of the third on-off valve 303, and to control the opening and closing of the fourth communication path R4 oriented toward the reservoir chamber 40 from the jack chamber 60 with high accuracy. Therefore, it is possible to control whether the amount of oil in the jack chamber 60 rapidly decreases by allowing the oil in the jack chamber 60 to be oriented toward the reservoir chamber 40 through the fourth communication path R4 having a large flow path area, or the amount of oil in the jack chamber 60 slowly decreases by allowing the oil in the jack chamber 60 to be oriented toward the reservoir chamber 40 through the third communication path R3 having a small flow path area, and to adjust the vehicle height with high accuracy.

In addition, the third on-off valve 303 may be provided on the third communication path R3 and in the space S1 which is an example of a fourth valve back pressure chamber that accommodates oil which applies the force in the direction in which the fourth on-off valve 304 is closed to the fourth on-off valve 304. The third on-off valve 303 may move between a position at which the inflow path that reaches the space S1 from the jack chamber 60 is open and a position at which the inflow path is closed. In a case where the third on-off valve 303 is at a position at which the inflow path that reaches the space S1 from the jack chamber 60 is closed, the oil is not supplied to the space S1 which becomes the back pressure chamber of the fourth on-off valve 304. Thus, the pressure becomes lower than that of the jack chamber 60. Therefore, the fourth on-off valve 304 is likely to move to the space S1, and the fourth on-off valve 304 is likely to be open. Meanwhile, in a case where the third on-off valve 303 is at a position at which the inflow path is open, the oil is supplied to the space S1 which becomes the back pressure chamber of the fourth on-off valve 304. Thus, the pressure becomes lower than that in a case where the third on-off valve 303 is at a position at which the inflow path is closed. Therefore, the fourth on-off valve 304 is unlikely to move to the space S1, and the fourth on-off valve 304 is unlikely to be open. With the front fork 21 according to the embodiment, by controlling the position of the third on-off valve 303, it is possible to control the open and closed state of the fourth on-off valve 304 with high accuracy.

Modification Example of Control Valve 305

In the control valve 305 according to the above-described embodiment, in order to perform sequential transition to the maintaining mode, the raising mode, and the lowering mode in order in accordance with the increase in amount of current to be supplied, a relationship between the amount of protrusion of the operation rod 324 and the position of the groove 305a of the control valve 305 is defined. In other words, in a case where the amount of protrusion of the operation rod 324 is less than the first reference amount, the position in the axial direction of the groove 305a of the control valve 305 overlaps the first radial communication hole 349a of the unit main body 330, and in a case where the amount of protrusion of the operation rod 324 is equal to or greater than the first reference amount, the position in the axial direction of the groove 305a becomes a position below the first radial communication hole 349a. Meanwhile, in a case where the amount of protrusion of the operation rod 324 is less than the first reference amount, the position in the axial direction of the groove 305a of the control valve 305 becomes the position above the first radial communication hole 349a of the unit main body 330, and in a case where the amount of protrusion of the operation rod 324 is equal to or greater than the first reference amount, by forming the groove 305a such that the position in the axial direction of the groove 305a overlaps the first radial communication hole 349a, sequential transition from the raising mode, to the maintaining mode, and to the lowering mode in accordance with the increase in amount of current to be supplied can be performed. In other words, only by changing the position of the groove 305a of the control valve 305, it is possible to realize the front wheel side flow path switching unit 300 which sequentially transitions from the raising mode, to the maintaining mode, and to the lowering mode.

Modification Example of Front Wheel Side Flow Path Switching Unit 300

A front wheel side solenoid 310 according to the above-described embodiment generates an axial thrust force to a plunger 313 in such a way that the amount of protrusion of an operation rod 314 from the case 315 increases to the extent that energization current to a coil 311 increases; however, the invention is not particularly limited thereto. For example, the front wheel side solenoid 310 may generate an axial thrust force to the plunger 313 in such a way that the amount of protrusion of the operation rod 314 from the case 315 decreases to the extent that energization current to the coil 311 increases. The front wheel side flow path switching unit 300 with this configuration as a single unit can control the three control modes according to the amount of current: the raising mode in which the vehicle height is raised; the lowering mode in which the vehicle height is lowered; and the maintaining mode in which the vehicle height is maintained.

In addition, in the above-described embodiment, a configuration in which the front wheel side flow path switching unit 300 which can be switched to three control modes including the raising mode, the lowering mode, and the maintaining mode is employed in the front fork 21 is illustrated, but the invention is not particularly limited. The front wheel side flow path switching unit 300 according to the above-described embodiment may be employed in the rear suspension 22.

What is claimed is:

1. A vehicle height adjustment apparatus comprising:
   a spring which has one end supported on a vehicle body side and the other end supported on a wheel side;
   a changing device which changes a length of the spring in accordance with an amount of fluid in an accommodation chamber that accommodates the fluid;
   a first valve which opens and closes a first flow path in which the fluid supplied from a pump is oriented toward a storage chamber that stores the fluid;
   a back pressure adjustment valve which opens and closes a discharge flow path oriented toward the storage chamber from a back pressure chamber; and
   a second valve which opens and closes a second flow path in which the fluid supplied from the pump is oriented toward the accommodation chamber in a case where the first valve is in a closed state, wherein
   the back pressure chamber accommodates the fluid that applies a force to the first valve in a direction in which the first valve closes.

2. The vehicle height adjustment apparatus according to claim 1, further comprising:
   a flow path forming member which forms the discharge flow path oriented toward the storage chamber from the back pressure chamber via a recess portion which is recessed from the back pressure chamber,
   wherein the back pressure adjustment valve is fitted to the recess portion of the flow path forming member to be movable between a position at which the discharge flow path is open and a position at which the discharge flow path is closed.

3. The vehicle height adjustment apparatus according to claim 2, further comprising:
   a third valve which opens and closes a third flow path oriented toward the storage chamber from the accommodation chamber by moving in accordance with the position of the back pressure adjustment valve.

4. The vehicle height adjustment apparatus according to claim 3, further comprising:
   a fourth valve which opens and closes a fourth flow path which is a flow path oriented toward the storage chamber from the accommodation chamber by moving in accordance with the position of the third valve,
   wherein a flow path area of the fourth flow path is greater than that of the third flow path.

5. The vehicle height adjustment apparatus according to claim 4, wherein the third valve is provided on the third flow path and in a fourth valve back pressure chamber which accommodates the fluid that applies a force to the fourth valve in a direction in which the fourth valve closes, and
   wherein the third valve moves between (i) a position at which an inflow path that reaches the fourth valve back pressure chamber from the accommodation chamber is open and (ii) a position at which the inflow path is closed.

* * * * *